(12) United States Patent
Imanaka

(10) Patent No.: US 11,843,274 B2
(45) Date of Patent: Dec. 12, 2023

(54) CHARGE CONTROL APPARATUS FOR CONTROLLING CHARGING OF AN ENERGY STORAGE DEVICE VIA PURALITY OF CHARGING PATHS CONNECTED IN PARALLEL ANSSOCIATED ENERGY STORAGE APPARTUS, AND AN ASSOCIATED CHARGING METHOD

(71) Applicant: GS Yuasa International Ltd., Kyoto (JP)

(72) Inventor: Yuki Imanaka, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 171 days.

(21) Appl. No.: 16/769,846

(22) PCT Filed: Dec. 4, 2018

(86) PCT No.: PCT/JP2018/044496
§ 371 (c)(1),
(2) Date: Jun. 4, 2020

(87) PCT Pub. No.: WO2019/111872
PCT Pub. Date: Jun. 13, 2019

(65) Prior Publication Data
US 2020/0395780 A1   Dec. 17, 2020

(30) Foreign Application Priority Data

Dec. 4, 2017   (JP) ................................. 2017-232723

(51) Int. Cl.
*H02J 7/00* (2006.01)
*B60L 53/62* (2019.01)
(Continued)

(52) U.S. Cl.
CPC ........ *H02J 7/007192* (2020.01); *B60L 53/62* (2019.02); *B60L 58/24* (2019.02);
(Continued)

(58) Field of Classification Search
CPC ........... H02J 7/007192; H02J 7/007182; H02J 7/00308; H02J 7/00304; H02J 7/0031;
(Continued)

(56) References Cited

U.S. PATENT DOCUMENTS 4,291,266 A * 9/1981 Portmann .............. G04C 10/02
                                                       136/293
5,789,900 A * 8/1998 Hasegawa ............ H01M 6/5011
                                                       320/132
(Continued)

FOREIGN PATENT DOCUMENTS

JP     H11-326913 A    11/1999
JP     2003-319570 A    11/2003
(Continued)

OTHER PUBLICATIONS

International Searching Authority, International Search Report and Written Opinion for International Application No. PCT/JP2018/044496, dated Feb. 5, 2019, (10 pages), Tokyo, Japan.

*Primary Examiner* — Yalkew Fantu
(74) *Attorney, Agent, or Firm* — Alston & Bird LLP

(57) ABSTRACT

This charging control device 50 controls charging of electricity storage elements B1-B4 and is provided with: a plurality of charging paths 61A, 61B leading to the electricity storage elements and connected in parallel with each other; voltage drop elements 64A, 64B and switches 65A, 65B which are connected in series on the charging paths; and a control unit 100. The control unit 100 controls the switches (Continued)

65A, 65B and thereby switches a charging path not to be energized among the plurality of charging paths 61A, 61B during charging.

13 Claims, 18 Drawing Sheets

(51) Int. Cl.
  *B60L 58/24* (2019.01)
  *H01M 10/48* (2006.01)
(52) U.S. Cl.
  CPC ..... *H02J 7/007182* (2020.01); *H01M 10/482* (2013.01); *H01M 10/486* (2013.01)
(58) Field of Classification Search
  CPC ............. H02J 7/00302; H02J 7/00306; H01M 10/441; H01M 10/48
  See application file for complete search history.

(56) References Cited

U.S. PATENT DOCUMENTS

| | | | | |
|---|---|---|---|---|
| 5,867,008 A * | 2/1999 | Du | ............... | H02J 7/0031 320/136 |
| 2002/0011821 A1 | 1/2002 | Fujisawa | | |
| 2004/0109274 A1* | 6/2004 | Sato | ............... | H02J 7/0031 361/90 |
| 2004/0192407 A1 | 9/2004 | Formenti | | |
| 2005/0062459 A1* | 3/2005 | Young | ............... | H02J 7/00308 320/134 |
| 2006/0145673 A1* | 7/2006 | Fogg | ............... | H02J 7/00304 323/282 |
| 2007/0129768 A1* | 6/2007 | He | ............... | H01M 10/44 607/34 |
| 2008/0217612 A1* | 9/2008 | Patterson | ............... | H01L 22/34 257/48 |
| 2008/0238527 A1* | 10/2008 | Bolz | ............... | H02J 7/0014 327/404 |
| 2008/0278116 A1* | 11/2008 | Matsunaga | ............... | H03K 17/6874 320/134 |
| 2008/0284380 A1* | 11/2008 | Chen | ............... | H02J 7/0016 320/154 |
| 2008/0307242 A1* | 12/2008 | Qu | ............... | H02J 9/005 713/320 |
| 2009/0058370 A1 | 3/2009 | Odaohhara | | |
| 2010/0237828 A1* | 9/2010 | Maegawa | ............... | H02J 7/0016 320/118 |
| 2010/0253293 A1* | 10/2010 | Wang | ............... | H02J 7/00309 320/164 |
| 2011/0043170 A1* | 2/2011 | Kim | ............... | H01M 10/48 320/136 |
| 2011/0133701 A1* | 6/2011 | Li | ............... | H02J 7/04 320/153 |
| 2011/0148342 A1* | 6/2011 | Wahlqvist | ............... | H02J 7/008 320/101 |
| 2011/0309795 A1* | 12/2011 | Firehammer | ............... | H01M 10/4207 320/118 |
| 2012/0112705 A1* | 5/2012 | Wang | ............... | H02J 7/00 320/152 |
| 2012/0176079 A1* | 7/2012 | Nakashima | ............... | H02J 7/35 320/101 |
| 2012/0286722 A1* | 11/2012 | Kabasawa | ............... | H02J 7/0018 320/107 |
| 2012/0313584 A1* | 12/2012 | Sugiyama | ............... | B60L 50/61 320/119 |
| 2013/0181681 A1* | 7/2013 | Mukai | ............... | H01M 10/425 320/128 |
| 2013/0229163 A1* | 9/2013 | Deng | ............... | H03K 17/082 323/299 |
| 2014/0139176 A1* | 5/2014 | Ji | ............... | H02J 7/007184 320/107 |
| 2014/0183942 A1* | 7/2014 | Sugiyama | ............... | B60L 15/007 307/10.1 |
| 2014/0341252 A1* | 11/2014 | Kratzschmar | ............... | H02H 5/04 374/45 |
| 2014/0354050 A1* | 12/2014 | Kung | ............... | H02J 7/0068 307/24 |
| 2016/0079843 A1* | 3/2016 | Yoo | ............... | G05F 1/56 323/313 |
| 2016/0261121 A1* | 9/2016 | Baek | ............... | H02J 7/00 |
| 2017/0106819 A1* | 4/2017 | Richardson | ............... | B60W 10/30 |
| 2017/0133862 A1* | 5/2017 | Jung | ............... | H02J 7/007 |
| 2017/0150860 A1* | 6/2017 | Park | ............... | H02P 27/06 |
| 2017/0160334 A1* | 6/2017 | Kawanaka | ............... | B60L 58/15 |
| 2017/0214257 A1* | 7/2017 | Shiraishi | ............... | B60L 58/15 |
| 2018/0004237 A1* | 1/2018 | Morimoto | ............... | G05D 23/20 |
| 2018/0048165 A1* | 2/2018 | Shiraishi | ............... | H02J 7/00302 |
| 2018/0205253 A1* | 7/2018 | Kwak | ............... | H02J 7/0036 |
| 2018/0219398 A1* | 8/2018 | Schuetz | ............... | A47L 11/4005 |
| 2018/0309172 A1* | 10/2018 | Ito | ............... | H01M 10/44 |
| 2019/0020074 A1* | 1/2019 | Motoichi | ............... | H02J 7/00714 |
| 2019/0288520 A1* | 9/2019 | Abdel-Monem | ............... | H02J 7/0029 |
| 2019/0319478 A1* | 10/2019 | Zhang | ............... | H01M 10/44 |
| 2020/0116791 A1* | 4/2020 | Song | ............... | H01M 10/4264 |
| 2020/0168867 A1* | 5/2020 | Maekawa | ............... | B60L 50/40 |
| 2020/0217893 A1* | 7/2020 | Song | ............... | G01R 31/382 |
| 2020/0285925 A1* | 9/2020 | Salman | ............... | G06K 19/0723 |
| 2021/0091576 A1* | 3/2021 | Zhang | ............... | H02J 7/0068 |
| 2021/0167608 A1* | 6/2021 | Veselic | ............... | H02J 7/0013 |

FOREIGN PATENT DOCUMENTS

| | | |
|---|---|---|
| JP | 2005-124273 A | 5/2005 |
| JP | 2008-131803 A | 6/2008 |
| JP | 2008-199717 A | 8/2008 |
| JP | 2008-283743 A | 11/2008 |
| JP | 2009-055729 A | 3/2009 |
| JP | 2012-231649 A | 11/2012 |
| JP | 2014-050235 A | 3/2014 |
| JP | 2016-015835 A | 1/2016 |
| JP | 2016-203792 A | 12/2016 |
| JP | 2017-118788 A | 6/2017 |
| JP | 2017-135883 A | 8/2017 |
| WO | WO-1999/048184 A1 | 9/1999 |

* cited by examiner

Forward voltage characteristics of diode

CHARGE CONTROL APPARATUS FOR CONTROLLING CHARGING OF AN ENERGY STORAGE DEVICE VIA PURALITY OF CHARGING PATHS CONNECTED IN PARALLEL ANSSOCIATED ENERGY STORAGE APPARTUS, AND AN ASSOCIATED CHARGING METHOD

CROSS REFERENCE TO RELATED APPLICATIONS

This application is a national stage application, filed under 35 U.S.C. § 371, of International Application No. PCT/JP2018/044496, filed Dec. 4, 2020, which claims priority to Japan Application No. 2017-232723, filed Dec. 4, 2017, the contents of both of which as are hereby incorporated by reference in their entirety.

BACKGROUND

Technical Field

The present invention relates to a technique for charging an energy storage device.

Description of Related Art

As a vehicle engine starting battery, a lithium ion secondary battery (hereinafter, LIB) is installed instead of a lead-acid battery. The merit of this is that the life of the battery is extended and the acceptance of regenerative charging is improved. Due to the difference in characteristics between the lead-acid battery and the LIB, the charge set voltage differs, so it is necessary to use a dedicated charger for each. In consideration of compatibility with lead-acid batteries, the outer shapes and terminal structures have been standardized. However, if the LIB is compatible with the lead-acid battery, charging may be performed at a charge voltage different from the assumed charge set voltage, such as charging with a charger for the lead-acid battery. Patent Document JP-A-2008-199717 describes that a diode is provided on the charging path in order to limit charging to the battery.

BRIEF SUMMARY

A large lithium ion secondary battery such as a vehicle engine starting battery has a large charge/discharge current and a large power loss on the energization path. Therefore, a method is conceivable in which a plurality of voltage drop elements are connected in parallel to reduce the current flowing through one voltage drop element so as to prevent failure in the voltage drop element such as a diode. However, due to variations in the characteristics of the elements themselves and the temperature characteristics, even if a plurality of voltage drop elements are connected in parallel, current may concentrate in one of the voltage drop elements, causing a failure. The present invention has been completed based on the above circumstances, and has an object to suppress failure in a voltage drop element during charging due to current concentration.

A charge control apparatus controls charging of an energy storage device. The charge control apparatus includes a plurality of charging paths connected in parallel for the energy storage device, a voltage drop element and a switch connected in series on each of the charging paths, and a control unit. The control unit controls the switches to switch the charging path, of the plurality of charging paths, which is deenergized during charging.

These techniques can be applied to a method of charging an energy storage device. The techniques can be applied to an energy storage apparatus including an energy storage device and a charge control apparatus. The techniques can be implemented in various forms such as an energy storage system, a charging path switching program, and a recording medium recording the program.

With this configuration, it is possible to suppress failure in a voltage drop element during charging due to current concentration.

DETAILED DESCRIPTION OF VARIOUS EMBODIMENTS

Figure 1:
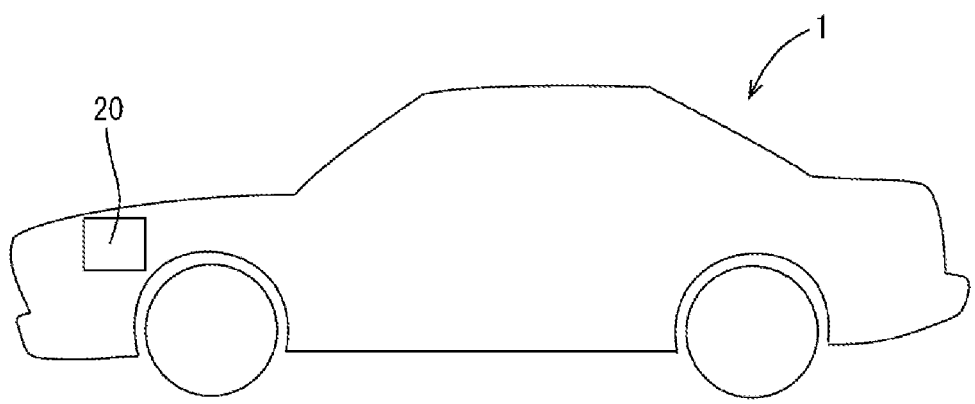
FIG. 1 is a side view of an automobile according to the first embodiment.

A charge control apparatus controls charging of an energy storage device. The charge control apparatus includes a plurality of charging paths connected in parallel for the energy storage device, a voltage drop element and a switch connected in series on each of the charging paths, and a control unit. The control unit controls the switches to switch the charging path, of the plurality of charging paths, which is deenergized during charging.

This configuration enables to lower the charge voltage for the energy storage device by the voltage drop element arranged in the charging path. Moreover, among the plurality of charging paths, the charging path that is not energized is switched during charging, so that it is possible to prevent current from concentrating on some of the charging paths and the temperature of the voltage drop element from increasing. This can suppress failure in the voltage drop element and safely charge the energy storage device.

The voltage drop element may be a diode. The diode has a temperature characteristic that the forward voltage decreases as the temperature increases. Therefore, current is likely to concentrate on one diode whose temperature has risen, making parallel connection difficult. Applying this technology can prevent current from concentrating on one diode and hence can suppress failure in the diode.

The control unit may switch between the charging paths when the charge voltage or the voltage of the energy storage device is higher than a set voltage.

This configuration enables to lower the charge voltage when the charge voltage or the voltage of the energy storage device is higher than the set voltage. Therefore, the energy storage device can be charged safely.

The control unit may switch between the charging paths based on a set time. With this configuration, because the charging paths are switched based on the set time, it is possible to prevent current from flowing unevenly in a specific charging path.

The control unit may switch between the charging paths based on a temperature condition for the charging paths. In this configuration, the charging path are switched according to a temperature condition for the voltage drop element. Therefore, it is possible to suppress abnormal heat generation of the voltage drop element regardless of the environmental temperature and the situation in the energy storage apparatus.

The control unit may control the switches in the charging paths such that during the switching control of the charging paths, the switches in the charging paths have an overlapping period in which the switches are simultaneously turned on. This configuration enables to prevent the plurality of switches from being turned off at the same time when the charging paths are switched, thereby preventing the stoppage of charging.

At least one charging path among the charging paths connected in parallel may have two FETs that are back-to-back connected and have built-in parasitic diodes. In this configuration, of the two back-to-back connected FETs, the FET on one side, whose built-in parasitic diode is in the forward direction with respect to the charging direction, is turned off, whereas the FET on the other side, whose built-in parasitic diode is in the reverse direction with respect to the charging direction, is turned on, thereby causing charge current to flow into the energy storage device via the FET and the parasitic diode on the other side. This makes it possible to use the parasitic diode as a voltage drop element. Back-to-back connection means connecting two FETs back to back, that is, connecting the drains of the two FETs or connecting the sources of the two FETs. An FET is a field effect transistor.

Each of the charging paths connected in parallel has two FETs back-to-back connected and having built-in parasitic diodes. The control unit may perform control to simultaneously turn on the two back-to-back connected FETs in at least one of the charging paths connected in parallel when the charge voltage or the voltage of the energy storage device is lower than a set voltage and, when the charge voltage or the voltage of the energy storage device is lower than a set voltage, may perform controls to turn off the FETs on one side, of the two FETs installed in each of the charging paths and back-to-back connected, in which the built-in parasitic diodes are in a forward direction with respect to a charging direction and turn on the FETs on the other side in which the built-in parasitic diodes are in a reverse direction with respect to the charging direction at different timings between the charging paths. When the timings to turn on differ, it means that the ON durations do not match exactly. This includes a case in which the FETs are turned on alternately such that the ON durations do not overlap and a case in which the switches to be turned on are switched while the ON durations partly overlap. In short, with regard to the FET on the other side, whose built-in parasitic diode is in the reverse direction with respect to the charging direction, in order to allow charging, the control unit performs control to turn on at least one FET in each charging path so as to prevent all the FETs from being turned off. Further, the FETs may be controlled such that the ON durations differ from each other between the respective charging paths.

In this configuration, in each charging path, two back-to-back FETs are turned on at the same time, so that charge current can flow without passing through the parasitic diodes. Therefore, it is not necessary to provide a dedicated charging path for normal operation, and the circuit configuration is simple. Further, when the charge voltage or the voltage of the energy storage device is higher than the set voltage, the charge current is made to flow via the parasitic diode of the FET while the charging paths are switched. This makes it possible to lower the charge voltage of the energy storage device while suppressing the temperature rise of the parasitic diode.

First Embodiment

1. Description of Battery

Figure 2:
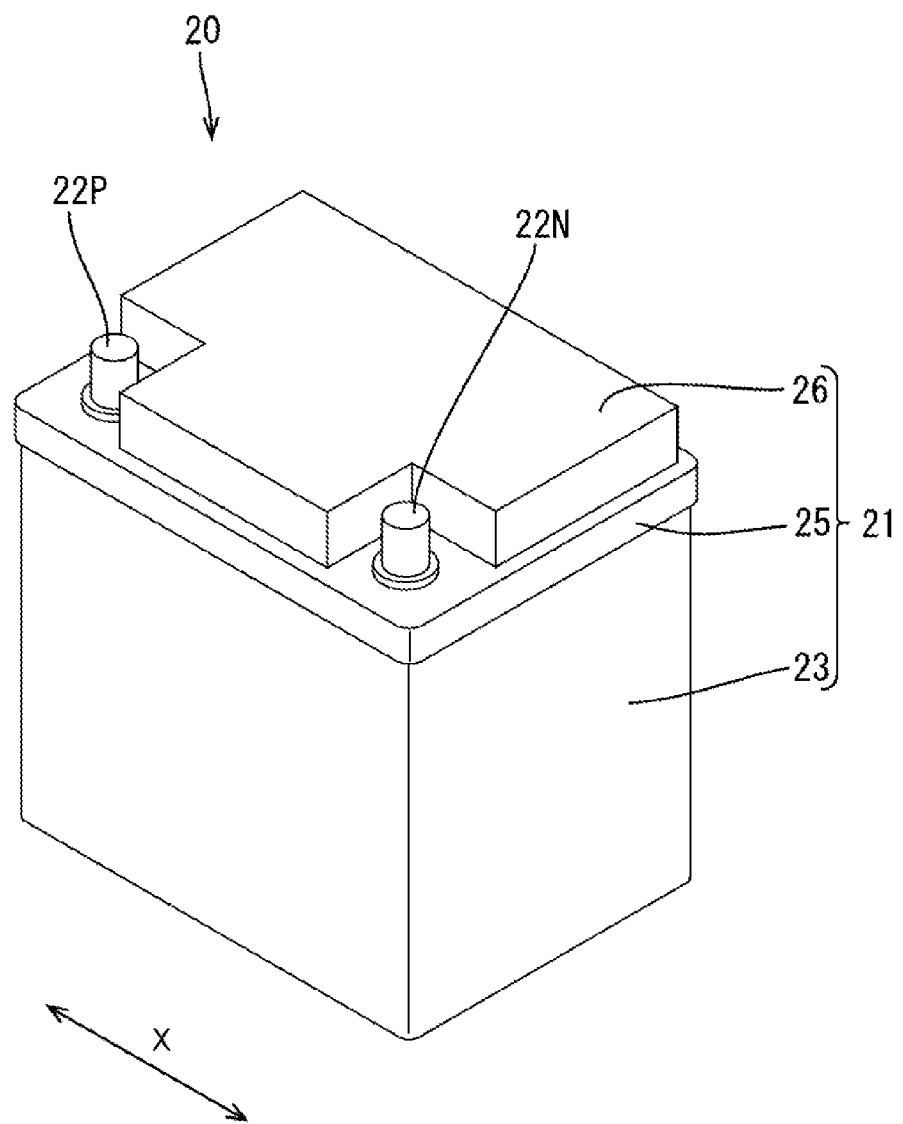
FIG. 2 is a perspective view of a battery.
Figure 3:
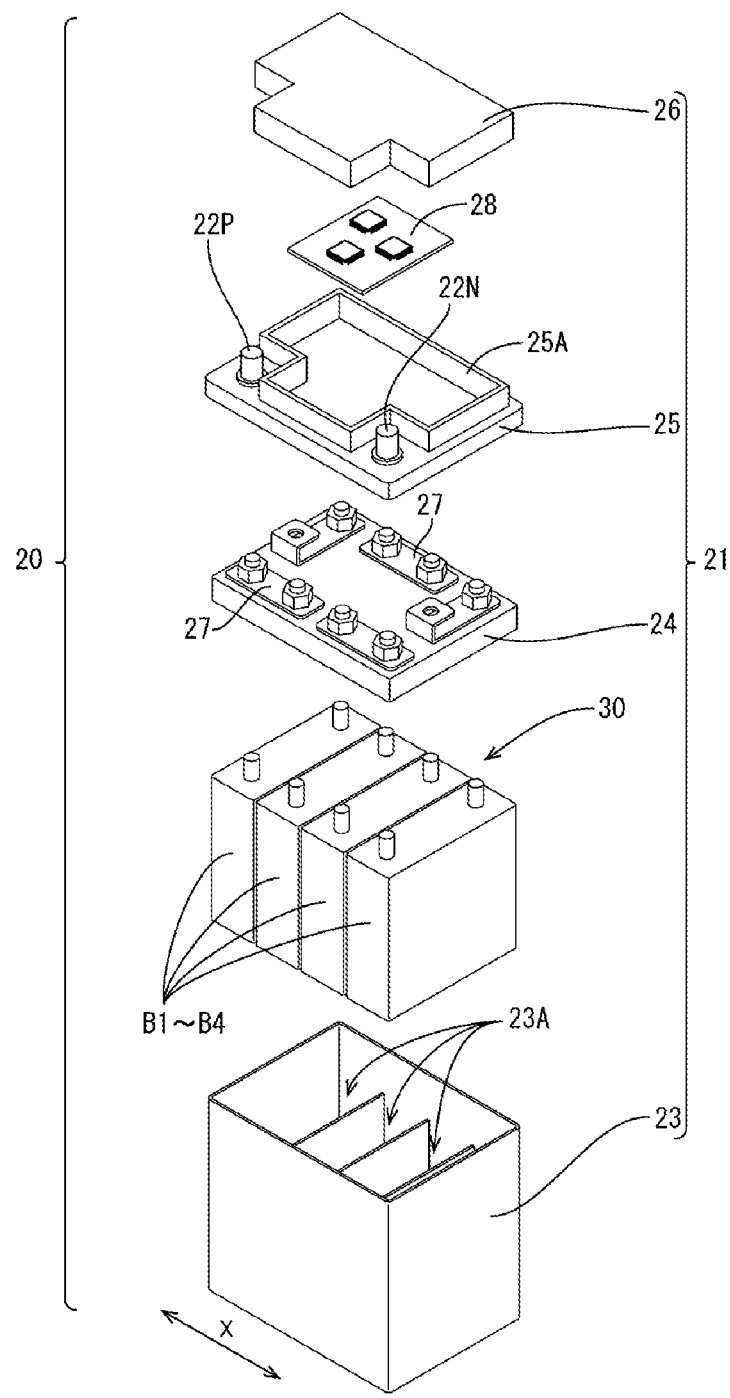
FIG. 3 is an exploded perspective view of the battery.
Figure 4:
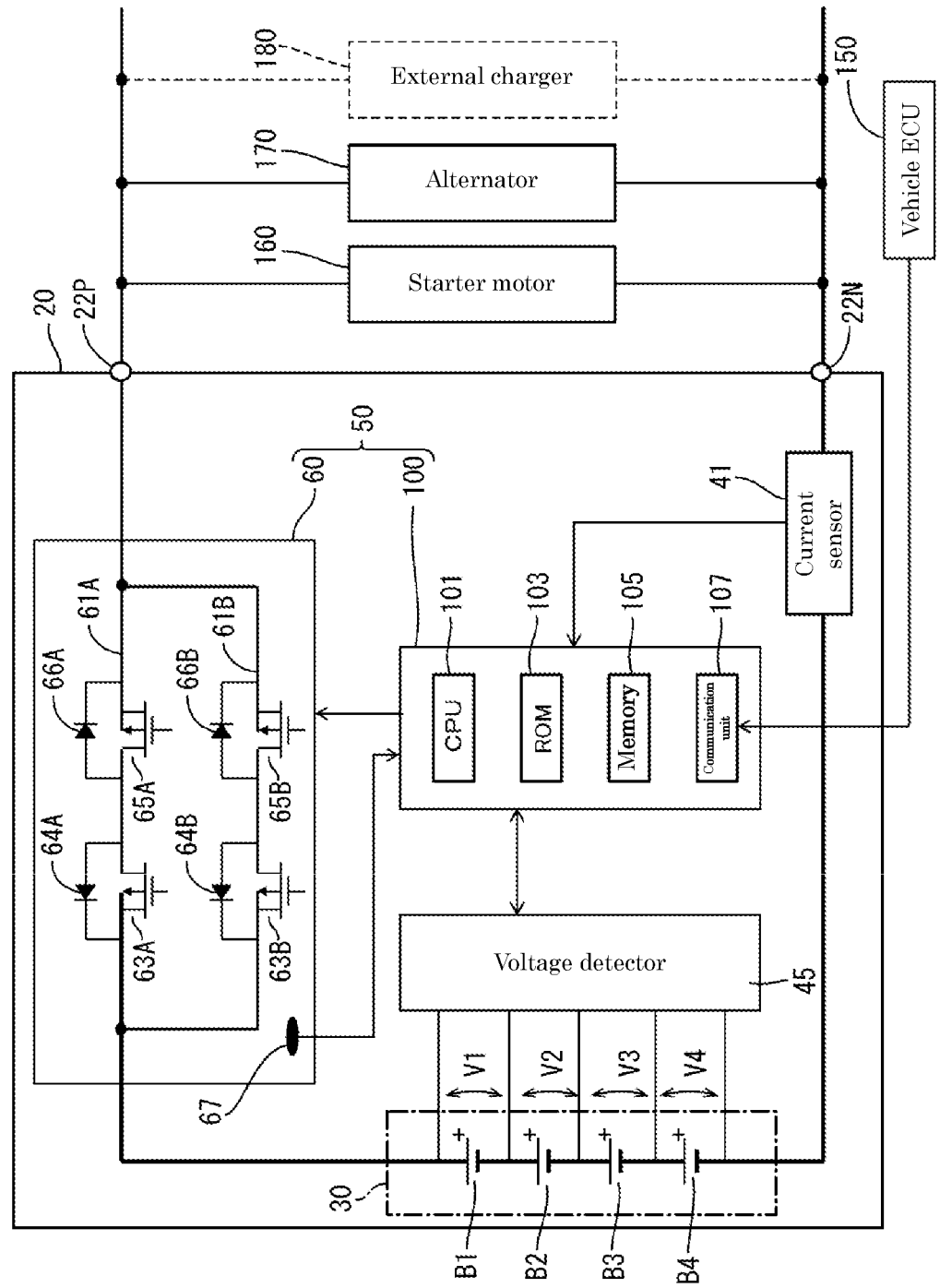
FIG. 4 is a block diagram showing the electrical configuration of the battery.

FIG. 1 is a side view of an automobile. FIG. 2 is a perspective view of a battery. FIG. 3 is an exploded perspective view of the battery. FIG. 4 is a block diagram showing the electric configuration of the battery.

As shown in FIG. 1, an automobile 1 includes a battery 20 that is an energy storage apparatus. As shown in FIG. 2, the battery 20 has a block-shaped battery case 21. The battery case 21 accommodates an assembled battery 30 including a plurality of secondary batteries B1 to B4 and a control board 28.

As shown in FIG. 3, the battery case 21 includes a box-shaped case main body 23 that opens upward, a positioning member 24 that positions the plurality of secondary batteries B1 to B4, and an inner lid 25 and an upper lid 26 which are mounted on the upper part of the case main body 23. In the case main body 23, as shown in FIG. 3, a plurality of cell chambers 23A for individually accommodating the respective secondary batteries B1 to B4 are provided side by side in the X direction.

As shown in FIG. 3, the positioning member 24 has a plurality of bus bars 27 disposed on the upper surface. The positioning member 24 is disposed on the upper part of the plurality of secondary batteries B1 to B4 disposed in the case main body 23 so as to position the plurality of secondary batteries B1 to B4 and connect them in series via the plurality of bus bars 27.

The inner lid 25 has a substantially rectangular shape in plan view, as shown in FIG. 2. At both end portions of the inner lid 25 in the X direction, a pair of terminal portions 22P and 22N to which a harness terminal (not shown) is connected are provided. The pair of terminal portions 22P and 22N are made of, for example, a metal such as a lead alloy. The terminal portion 22P is a positive electrode terminal portion and the terminal portion 22N is a negative electrode terminal portion.

On the upper surface of the inner lid 25, an accommodation portion 25A is provided. The control board 28 is accommodated inside the accommodation portion 25A of the inner lid 25. When the inner lid 25 is attached to the case main body 23, a secondary battery B and the control board 28 are connected. Further, the upper lid 26 is mounted on the upper part of the inner lid 25 so as to close the upper surface of the accommodation portion 25A accommodating the control board 28.

The electrical configuration of the battery 20 will be described with reference to FIG. 4. The battery 20 is a 12-V system for starting the engine and includes the assembled battery 30, a current sensor 41, a voltage detector 45, and a charge control apparatus 50.

The assembled battery 30 includes four lithium ion secondary batteries B1 to B4 connected in series. The lithium ion secondary batteries B1 to B4 are an example of the "energy storage device" according to the present invention.

The current sensor 41 is provided inside the battery case 21 and detects a current I flowing through the assembled battery 30. The current sensor 41 is electrically connected to a management unit 100 via a signal line, and an output from the current sensor 41 is captured by the management unit 100.

The voltage detector 45 is provided inside the battery case 21 and detects battery voltages V1 to V4 of the respective lithium ion secondary batteries B1 to B4 and a total voltage Ev of the assembled battery 30. The voltage detector 45 is electrically connected to a management unit 100 via a signal line, and an output from the voltage detector 45 is captured by the management unit 100.

$$Ev = V1 + V2 + V3 + V4$$

The charge control apparatus 50 includes a charge circuit 60 and the management unit 100. The charge circuit 60 includes a first charging path 61A, a second charging path 61B, and a temperature sensor 67. The first charging path 61A and the second charging path 61B are between the positive electrode of the assembled battery 30 and the positive electrode side terminal portion 22P, and are connected in parallel with each other.

A first FET 63A and a second FET 65A are provided in the first charging path 61A. The first FET 63A and the second FET 65A are P-channel field effect transistors, and are back-to-back connected. Specifically, the first FET 63A has a source connected to the positive electrode of the assembled battery 30, and the second FET 65A has a source connected to the positive electrode side terminal portion 22P. The drains of the first FET 63A and the second FET 65A are commonly connected. The first FET 63A has a built-in parasitic diode 64A, and the second FET 65A has a built-in parasitic diode 66A. The forward direction of the parasitic diode 64A is the same as the charging direction, and the forward direction of the parasitic diode 66A is the same as the discharging direction.

A first FET 63B and a second FET 65B are provided in the second charging path 61B. The first FET 63B and the second FET 65B are P-channel field effect transistors, and are back-to-back connected. Specifically, the first FET 63B has a source connected to the positive electrode of the assembled battery 30, and the second FET 65B has a source connected to the positive electrode side terminal portion 22P. The drains of the first FET 63B and the second FET 65B are commonly connected. The first FET 63B has a parasitic diode 64B, and the second FET 65B has a parasitic diode 66B. The forward direction of the parasitic diode 64B is the same as the charging direction, and the forward direction of the parasitic diode 66B is the same as the discharging direction.

The temperature sensor 67 detects the temperature of each of the FETs 63A, 63B, 65A, and 65B. The temperature sensor 67 is electrically connected to a management unit 100 via a signal line, and an output from the temperature sensor 67 is captured by the management unit 100.

The management unit 100 includes a CPU (central processing unit) 101 having a calculation function, a ROM 103, a memory 105, and a communication unit 107 and is provided on the control board 28.

The CPU 101 monitors the current I flowing through the assembled battery 30 based on an output from the current sensor 41. The CPU 101 monitors the voltages V1 to V4 of the respective lithium ion secondary batteries B1 to B4 and the total voltage Ev of the assembled battery 30 based on outputs from the voltage detector 45. Further, the CPU 101 monitors the temperature of each of the FET 63A, 65A, 63B, and 65B based on an output from the temperature sensor 67.

During charging, the CPU 101 detects the magnitude of the total voltage Ev of the assembled battery 30 and executes a switching procedure for switching between the charging paths 61A and 61B for the assembled battery 30. The CPU 101 corresponds to the "control unit" in the present invention.

Figure 8:
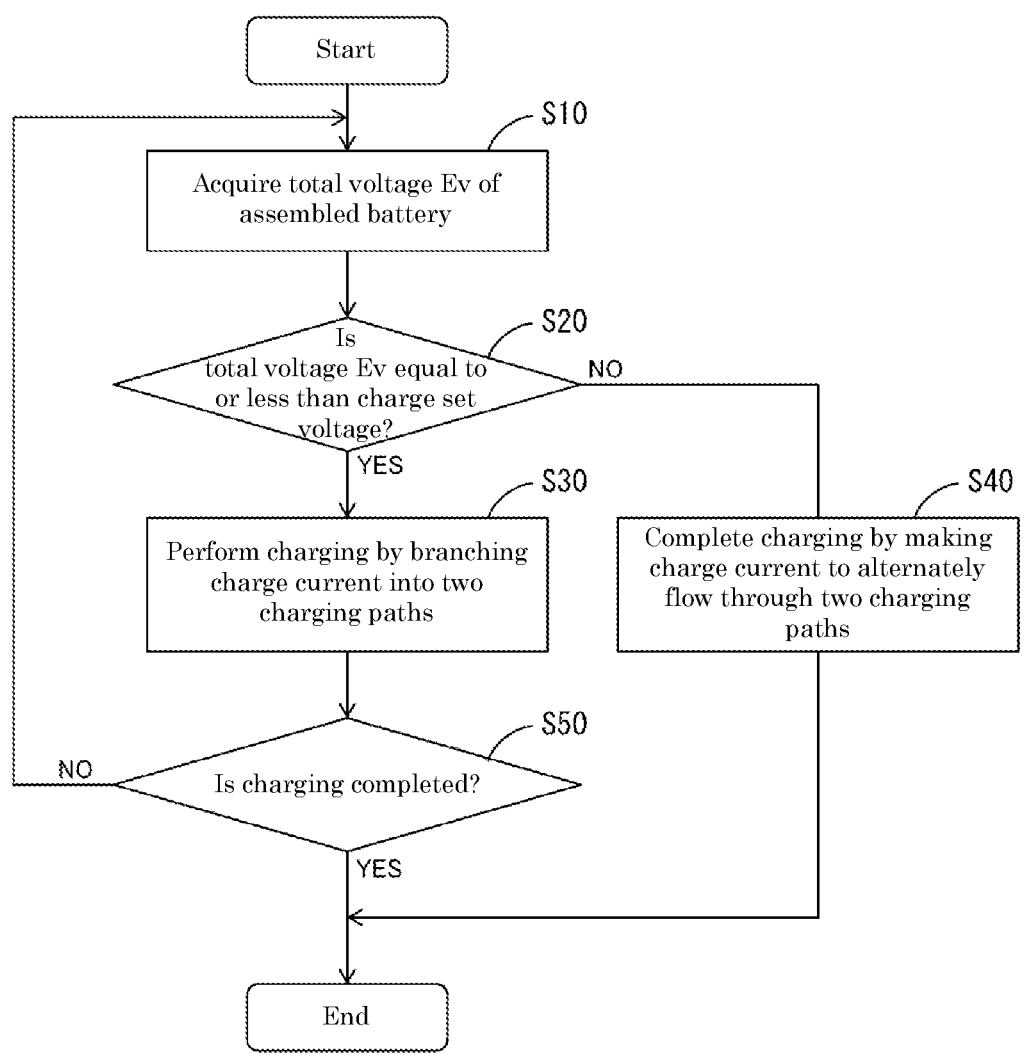
FIG. 8 is a flowchart for the switching between the charging paths.

The ROM 103 stores a program for executing the charging path switching procedure (S10 to S50 shown in FIG. 8). The program can be stored in a recording medium such as a CD-ROM and transferred. The program can be distributed via a telecommunication circuit.

The communication unit 107 is provided for communication with a vehicle ECU (Electronic Control Unit) 150 mounted in the automobile 1. Upon being mounted in the vehicle, the communication unit 107 is connected to the vehicle ECU 150 via a signal line. The management unit 100 can receive information about the vehicle such as the operating state of the engine (stopped or driven) from the vehicle ECU 150.

As shown in FIG. 4, the battery 20 is connected to a starter motor 160 for starting the engine, a vehicle load such as electrical components, and an alternator 170. When the amount of power generated by the alternator 170 is larger than the power consumption of the vehicle load during engine driving, the battery 20 is charged by the alternator 170.

When the amount of power generated by the alternator 170 is smaller than the power consumption of the vehicle load, the battery 20 is discharged to make up for the shortage. While the engine is stopped, the alternator 160 stops generating power. Therefore, the battery 20 is in a state in which power supply is stopped (state in which the battery is not charged), and is in a state in which the battery is only discharged for the vehicle load.

The battery 20 can be charged by connecting an external charger 180 outside the vehicle, for example, during parking, in addition to the vehicle-mounted alternator 170. Both the alternator 170 and the external charger 180 outside the vehicle are DC outputs.

The battery 20 includes the lithium ion secondary batteries B1 to B4, the current sensor 41, the voltage detector 45, and the charge control apparatus 50, and thus corresponds to the "energy storage apparatus" according to the present invention.

2. Charge Voltage Control and Parallel Connection of Diodes

Due to the difference in characteristics, lead-acid batteries and lithium ion secondary batteries have different charge set voltages (the set values of charge voltages). In the case of the 12 V system, a charge set voltage Eo for lead-acid batteries is 14.8 V and the charge set voltage Eo for lithium ion secondary batteries is 14 V.

For example, when the battery 20 that uses a lithium ion secondary battery as an energy storage device is charged by an external charger for lead-acid storage, charging is sometimes performed at a voltage (14.8 V) higher than the assumed charge set voltage (14 V). For safety reasons, it is preferable that the charge voltage does not exceed the charge set voltage Eo.

Figure 10:
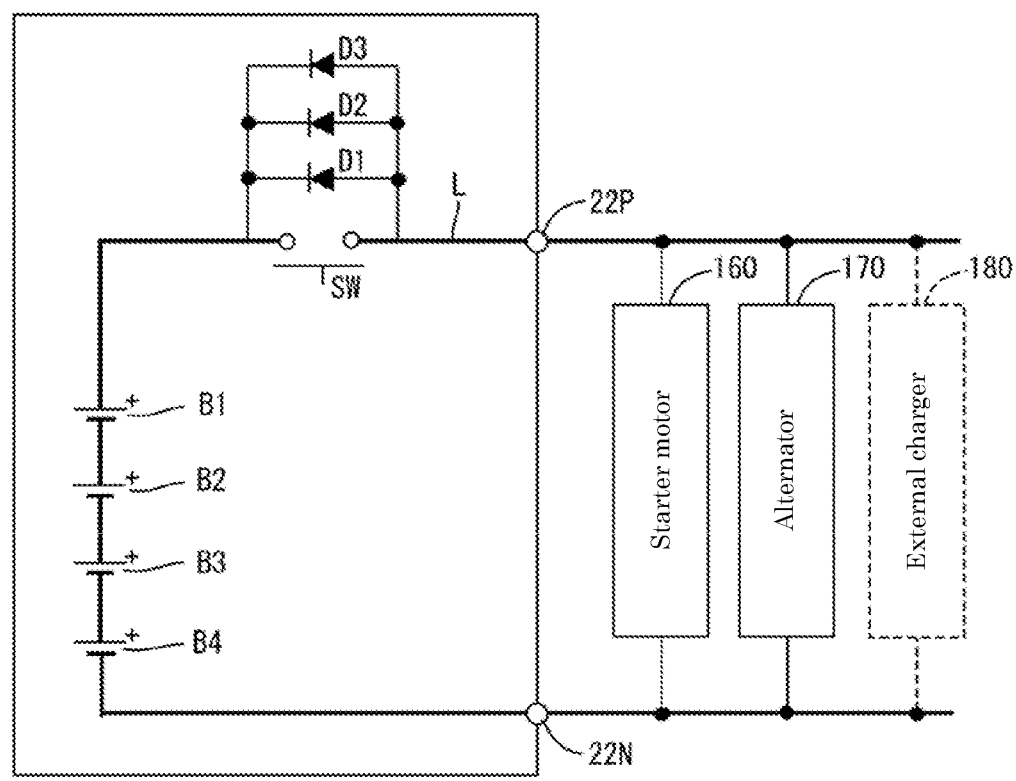
FIG. 10 is a diagram showing a comparative example of a charge circuit.

Therefore, when the total voltage Ev of the assembled battery 30 exceeds the assumed charge set voltage Eo, the charge voltage may be lowered by using the voltage drop effect of a diode D provided in a charging path L as shown in FIG. 10. In order to prevent the diode D from generating heat and failing due to power loss on the charging path, it is possible to connect a plurality of diodes D in parallel to divide the current. Referring to FIG. 10, three diodes D1 to D3 are connected in parallel.

Figure 11:
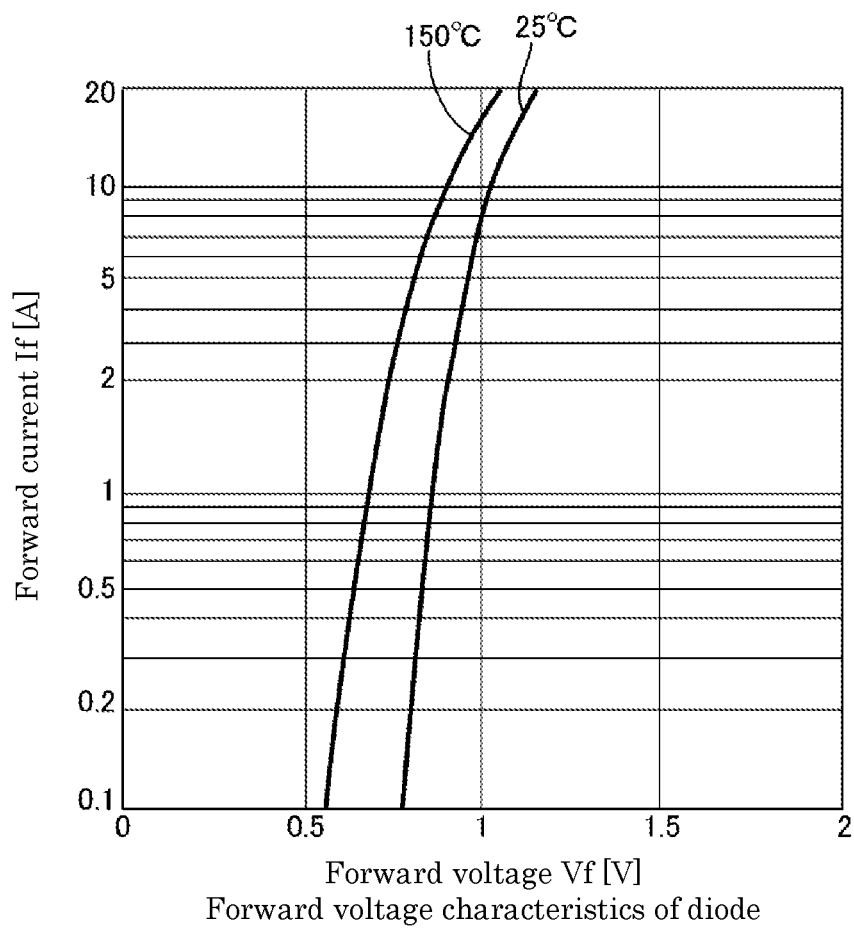
FIG. 11 is a graph showing the temperature characteristics of the forward voltage of a diode.

As shown in FIG. 11, the diode D has a characteristic that a forward voltage Vf decreases as the temperature increases.

Since the diodes D have individual differences and variations in discharge performance, the diodes D1 to D3 connected in parallel have variations in temperature rise during charging. In the diode D that increases in temperature more than the other diodes, the forward voltage Vf decreases more to allow current to easily flow. Therefore, even if the plurality of diodes D1 to D3 are connected in parallel, current concentrates on some of the diodes D whose temperatures have risen, and the diodes D fail.

Figure 5:
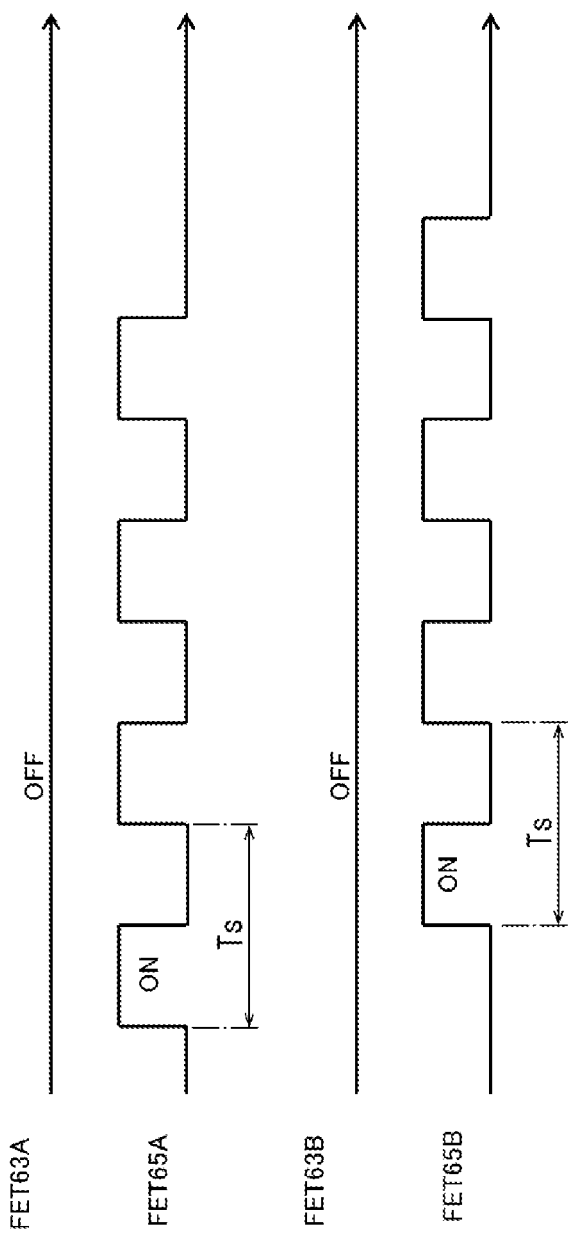
FIG. 5 is a chart showing the ON/OFF switching of each FET.

Accordingly, when the total voltage Ev of the assembled battery 30 is higher than the charge set voltage Eo during charging, the CPU 101 performs control to turn off the FET 63A in the first charging path 61A and the FET 63B in the second charging path 61B as shown in FIG. 5. Further, the CPU 101 inputs an ON signal (a signal for controlling to turn on the FET) to the FET 65A in the first charging path 61A at a predetermined control cycle Ts, while inputting an ON signal to the FET 65B in the second charging path 61B at a cycle shifted by half the cycle. Inputting ON signals to the respective FETs 65A and 65B will turn on them alternately for each half cycle of the control cycle Ts.

Figure 6:
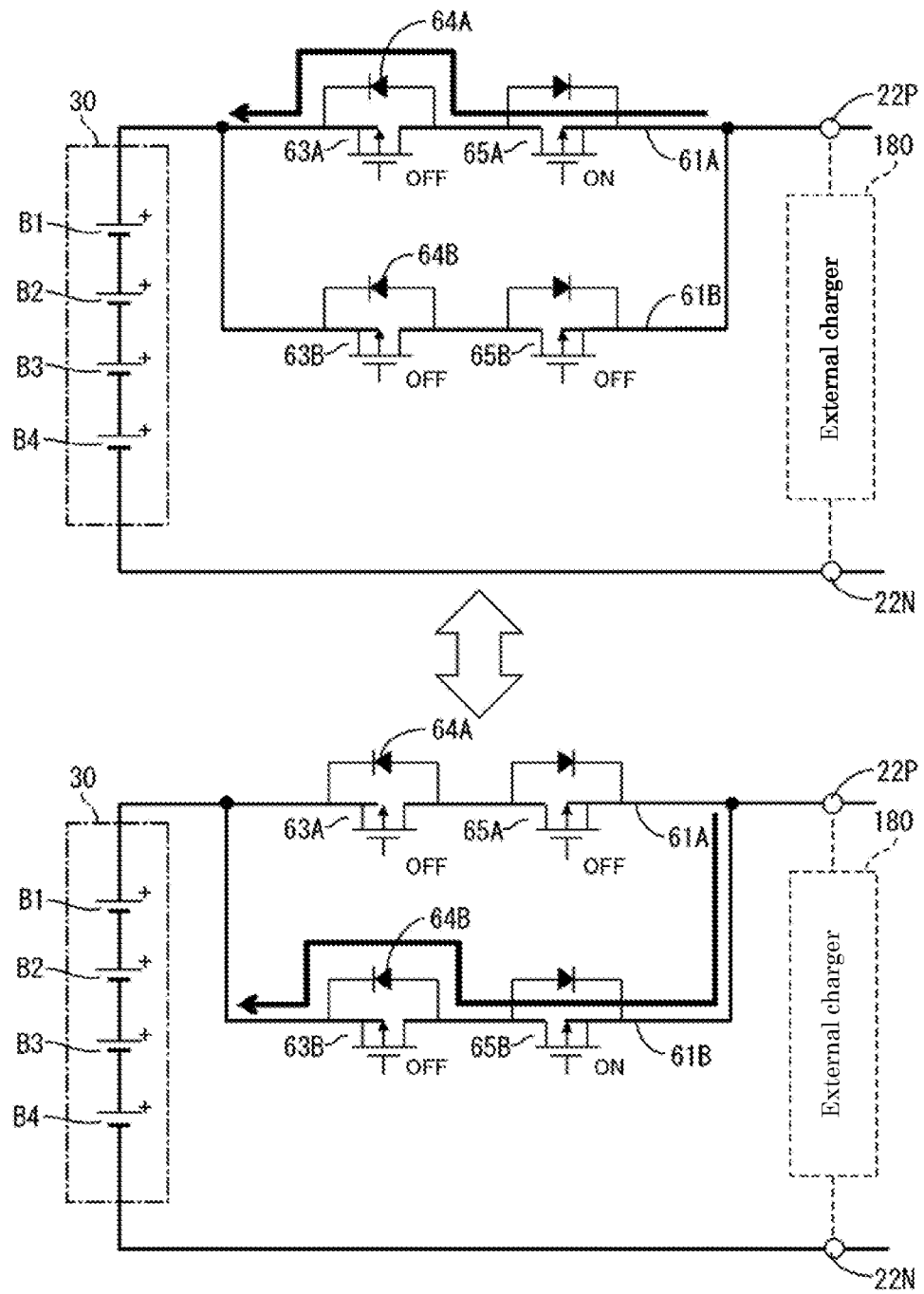
FIG. 6 is a diagram showing the switching between charging paths.

As a result, the two charging paths 61A and 61B are switched between the energized state and the deenergized state every half cycle Ts/2 of the control cycle Ts. As shown in FIG. 6, the charge current to the assembled battery 30 alternately flows in the charging paths 61A and 61B such that when the charge current flows in one charging path (for example, 61A), the other charging path (for example, 61B) is deenergized. The half cycle Ts/2 corresponds to the "set time" in the present invention.

This causes a voltage drop due to the parasitic diode 64A or 64B regardless of in which of the first charging path 61A and the second charging path 61B the charge current is flowing. Therefore, the charge voltage for the assembled battery 30 can be lowered.

Because the charge current is made to alternately flow through the two charging paths 61A and 61B, current does not concentrate on one of the parasitic diodes 64A and 64B. This can prevent failure in the parasitic diodes 64A and 64B.

FIG. 8 shows a charging path switching procedure executed by the CPU 101. The switching procedure is composed of five steps S10 to S50, and is executed when the CPU 101 detects the charging of the assembled battery 30. Whether or not the battery is charged can be determined based on the current detected by the current sensor 41.

A charging path switching operation will be described by taking as an example the case in which the battery 20 is charged by the external charger 180 for lead-acid storage. The charge voltage of the external charger 180 is 14.8 V.

When the CPU 101 detects charging by the external charger 180, the CPU 101 acquires the total voltage Ev of the assembled battery 30 from an output from the voltage detector 45 (S10).

The CPU 101 then compares the total voltage Ev of the assembled battery 30 with the charge set voltage Eo, and determines whether the total voltage Ev of the assembled battery 30 is equal to or lower than the charge set voltage Eo (S20). The charge set voltage Eo is 14 V.

Figure 9:
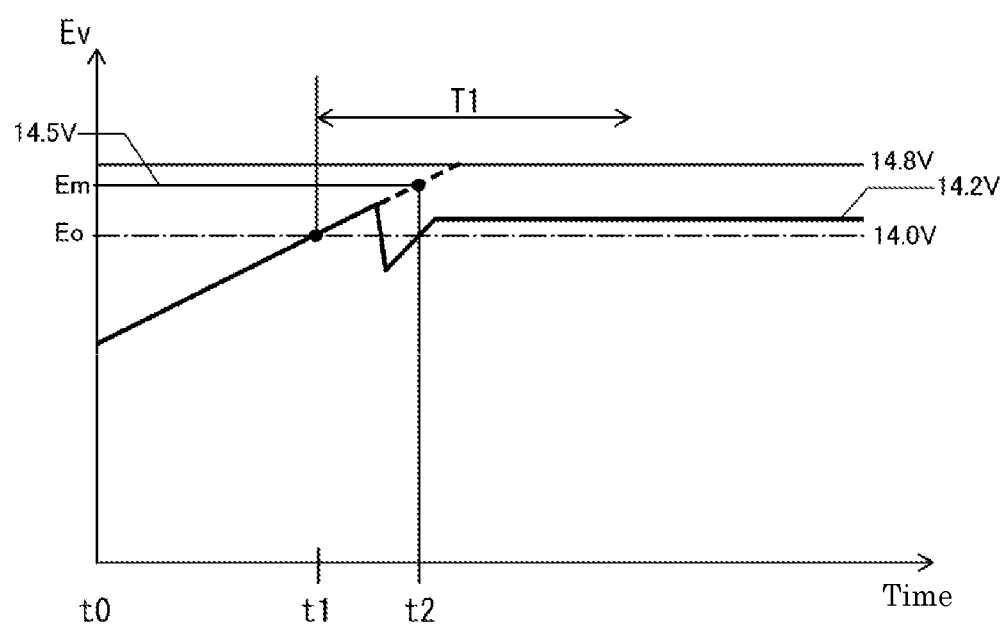
FIG. 9 is a graph showing the transition of the total voltage of an assembled battery during charging.

FIG. 9 is a graph showing a change in the voltage of the assembled battery after the start of charging. As shown in FIG. 9, at time t0 immediately after the start of charging, the total voltage Ev of the assembled battery 30 is less than 14 V, and hence YES is obtained in step S20.

Figure 7:
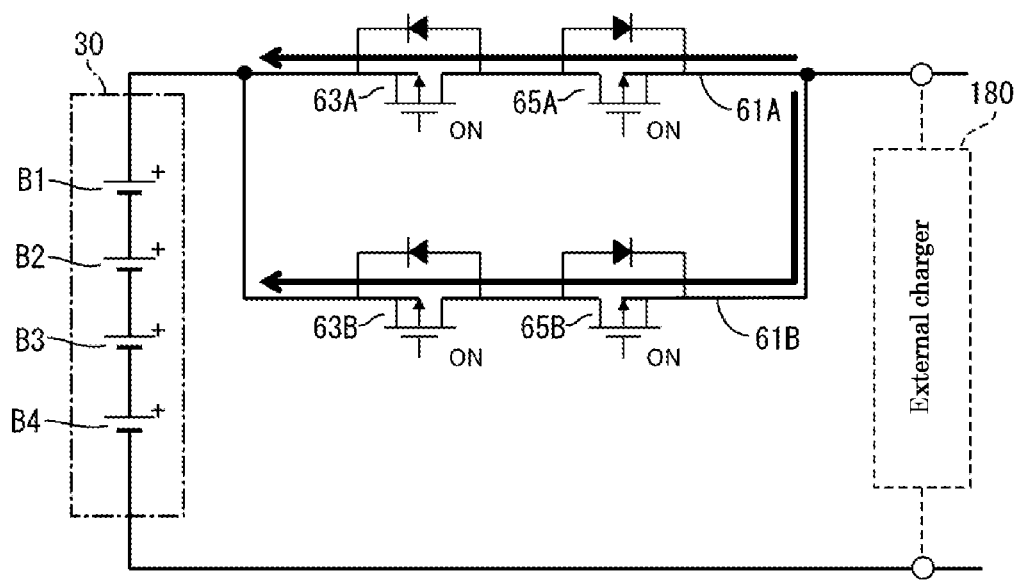
FIG. 7 is a diagram showing the switching between the charging paths.

If YES is obtained in step S20, the CPU 101 performs control to turn on all the FETs 63A, 65A, 63B, and 65B provided in the first charging path 61A and the second charging path 61B. As a result, as shown in FIG. 7, charge current from the external charger 180 branches and flows into the two charging paths 61A and 61B to charge the assembled battery 30 (S30). Subsequently, the CPU 101 determines whether the charging is completed (S40). If the charging is not completed, the process returns to step S10.

After the start of charging, the assembled battery 30 is charged by the charge current that branches and flows into the two charging paths 61A and 61B, and the total voltage Ev rises. When all the FETs are turned on, no current flows in parasitic diodes 64 and 66, so that charging is performed without lowering the charge voltage.

When the total voltage Ev of the assembled battery 30 reaches the charge set voltage Eo (time t1 in FIG. 9), NO is obtained in step S20.

If NO is obtained in S20, the CPU 101 performs control to turn off the FET 63A in the first charging path 61A and the FET 63B in the second charging path 61B. The FET 65A in the first charging path 61A and the FET 65B in the second charging path 61B are controlled so as to be alternately turned on and off.

As a result, during the period T1 after the total voltage Ev of the assembled battery 30 reaches the charge set voltage Eo, as shown in FIG. 6, the charge current alternately flows from the external charger 180 to the two charging paths 61A and 61B, thus charging the assembled battery 30 until the charging is completed (S40).

The charging of the assembled battery 30 ends when the charging end condition is satisfied such that the value of the charge current becomes a predetermined value or less or reaches an upper limit voltage Em.

This causes a voltage drop due to the parasitic diode 64A or 64B regardless of in which of the first charging path 61A and the second charging path 61B the charge current is flowing in a period T1 after the total voltage Ev of the assembled battery 30 reaches the charge set voltage Eo.

Accordingly, when the charge voltage (output voltage) of the external charger 180 is higher than the charge set voltage Eo, the charge voltage can be lowered by the parasitic diodes 64A and 64B to charge the assembled battery 30.

FIG. 9 shows the transition of the total voltage Ev of the assembled battery 30 at the time of charging. The "solid line" indicates the transition of the voltage when the control for lowering the charge voltage is executed, and the "dashed line" indicates the transition of the voltage when the control for lowering the charge voltage is not executed. The upper limit voltage Em shown in FIG. 9 is the upper limit voltage (the voltage at which charging is stopped) of the assembled battery 30. The upper limit voltage Em is a value higher than the charge set voltage of 14 V and lower than the charge voltage of 14.8 V of the external charger 180, and is, for example, 14.5 V.

After the start of charging, at time t1 in FIG. 9, the total voltage Ev of the assembled battery 30 exceeds the charge set voltage Eo. If the control to lower the charge voltage is not executed, the total voltage Ev of the assembled battery 30 rises afterward. At time t2 when the total voltage Ev reaches the upper limit voltage Em, the protecting operation of shutting off the charge circuit 60 (turning off all the FETs to cut off current) is effected to stop charging.

When the control for lowering the charge voltage is executed, the control for alternately turning on the two FETs 65A and 65B is executed to lower the charge voltage for the assembled battery Ev from 14.8 V to about 14.2 V at the timing of time t1 shown in FIG. 9 when the total voltage Ev of the assembled battery 30 exceeds the charge set voltage Eo. Therefore, it is possible to prevent the total voltage Ev of the assembled battery 30 from rising to the upper limit voltage of 14.5 V, and it is possible to continue charging the assembled battery 30 after time t2.

As described above, during charging by the external charger 180, when the total voltage Ev of the assembled battery 30 becomes higher than the charge set voltage Eo, a current is made to flow through the parasitic diodes 64A and 64B to lower the charge voltage. In addition to this, when the total voltage Ev of the assembled battery 30 becomes higher than the charge set voltage Eo during charging by the alternator 170, a current may be made to flow through the parasitic diodes 64A and 64B to lower the charge voltage. The operation during charging has been mainly described above. However, at the time of discharging, it is preferable to turn on all the FETs 63A, 63B, 65A, and 65B to branch the discharge current to the two charging paths 61A and 61B.

3. Description of Effect

In this configuration, when the total voltage Ev of the assembled battery 30 is higher than the charge set voltage Eo, the charge voltage for the assembled battery 30 can be lowered by the charge circuit 60 inside the battery. This improves the safety of the battery 20. In addition, because the charge current is made to alternately flow through the two charging paths 61A and 61B, current does not concentrate on one of the parasitic diodes 64A and 64B. This can suppress failure in the parasitic diodes 64A and 64B.

In this configuration, because the charge voltage of the external charger 180 is 14.8 V and the upper limit voltage of the assembled battery 30 is 14.5 V, the charge voltage is lowered by 0.6 V by the parasitic diodes 64A and 64B, so that the total voltage Ev of the assembled battery 30 can be suppressed to equal to or less than the upper limit voltage of 14.5 V. The voltage drop amount of the charge voltage due to a voltage drop element such as a parasitic diode is preferably such that the charge voltage after the drop is lower than the upper limit voltage Em so as not to make the total voltage Ev of the assembled battery 30 exceed the upper limit voltage Em. Even if the charge voltage after the drop is higher than the upper limit voltage, the period until the total voltage Ev of the assembled battery 30 reaches the upper limit voltage Em is delayed compared to the case in which the charge voltage is not lowered. This provides the advantage of prolonging the charging time of the assembled battery 30 accordingly.

In this configuration, the two charging paths 61A and 61B are switched for each half cycle Ts/2, that is, for each set time, so that the charge current can be prevented from being disproportionately flowing through the specific charging path 61A or 61B. This can suppress failure in the parasitic diodes 64A and 64B.

The lithium ion secondary batteries B1 to B4 have higher internal resistance at low temperature than other secondary batteries, and hence tend to reach an overvoltage condition when charged at low temperature. As a countermeasure against this problem, it may be possible to suppress the charge current. In this configuration, when the total voltage Ev of the assembled battery 30 is higher than the charge set voltage Eo, the charge voltage is controlled to be lowered. Because the charge current can be suppressed by lowering the charge voltage, it is possible to prevent the lithium ion secondary batteries B1 to B4 from reaching an overvoltage condition due to charging at low temperature.

Second Embodiment

In the first embodiment, when the total voltage Ev of the assembled battery 30 is higher than the charge set voltage Eo, the CPU 101 performs control to alternately switch between the two charging paths 61A and 61B between the energized state and the deenergized state by alternately inputting an ON signal (a signal for controlling to turn on the FET) to the FET 65A in the first charging path 61A and the FET 65B in the second charging path 61B while shifting the signal by the half cycle Ts/2.

In the second embodiment, when a total voltage Ev of an assembled battery 30 is higher than a charge set voltage Eo, a CPU 101 performs control to switch between charging paths 61A and 61B according to temperature conditions for an FET 63A and an FET 63B, specifically, a temperature difference. The temperature information of the FETs 63A and 63B can be acquired by a temperature sensor 67.

Figure 12:
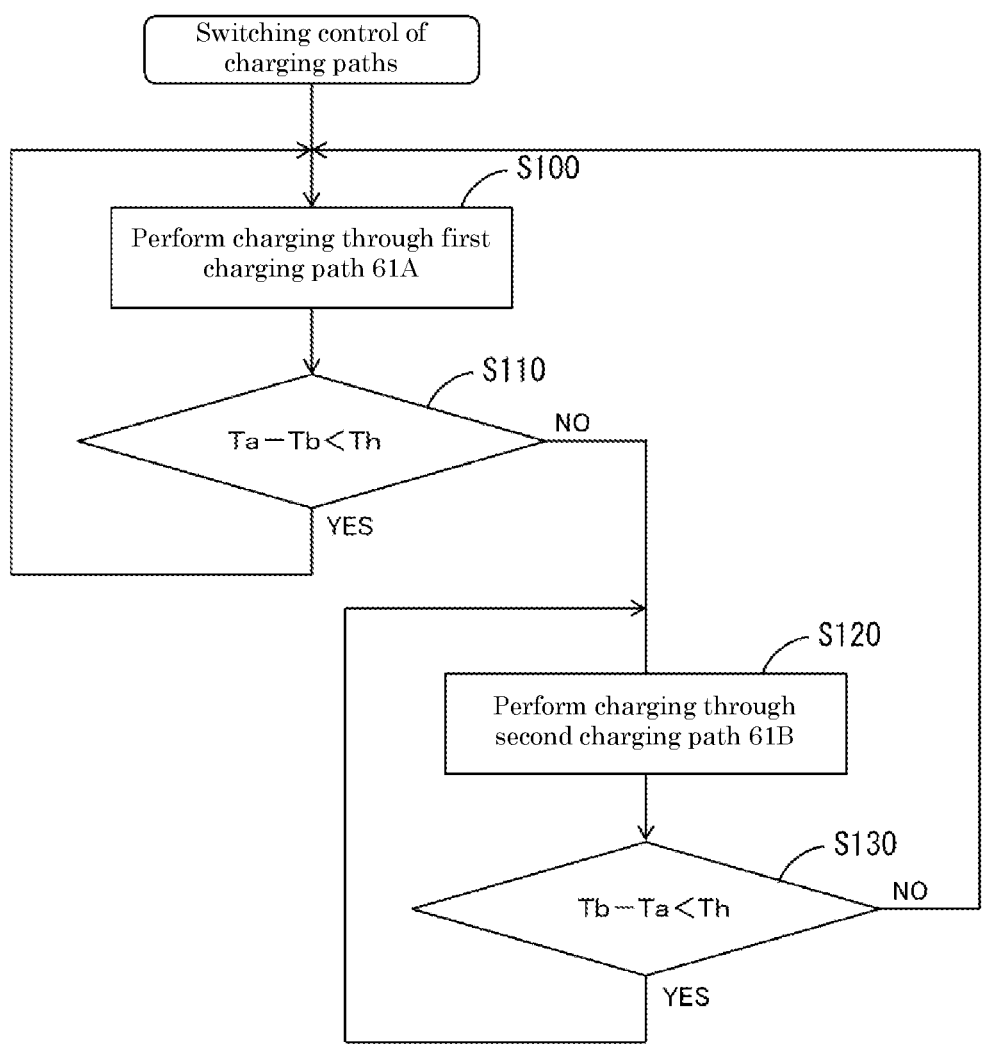
FIG. 12 is a flowchart for the switching between the charging paths according to the second embodiment.

FIG. 12 is a flowchart for charging path switching control based on a temperature difference. When the total voltage Ev of the assembled battery 30 is higher than the charge set voltage Eo, the CPU 101 performs control to turn off the FET 63A in a first charging path 61A and the FET 63B in a second charging path 61B.

In addition, the CPU 101 performs control to turn off an FET 65A in the first charging path 61A and an FET 65B in the second charging path 61B. As a result, only the first charging path 61A is set in the energized state, and the assembled battery 30 is charged through the first charging path 61A (S100).

The CPU 101 acquires a temperature Ta of the FET 63A in the first charging path 61A and a temperature Tb of the FET 63B in the second charging path 61B from outputs from the temperature sensor 67 while charging is performed using the first charging path 61A.

The CPU 101 then calculates a temperature difference Ta−Tb and performs the processing of comparing with a threshold Th. When the temperature difference Ta−Tb is smaller than the threshold Th, the CPU 101 continues charging via the first charging path 61A (S110: YES).

On the other hand, when the temperature difference Ta−Tb is larger than the threshold Th, the CPU 101 switches the charging path from the first charging path 61A to the second charging path 61B and performs charging (S120). Specifically, the CPU 101 switches the charging path by switching the FET 65A in the first charging path 61A from on to off and switching the FET 65B in the second charging path 61B from off to on.

After switching between the charging path, the CPU 101 calculates a temperature difference Tb−Ta from an output from the temperature sensor 67 and compares it with the threshold Th.

When the temperature difference Tb−Ta is smaller than the threshold Th, the CPU 101 continues charging via the second charging path 61B (S130: YES).

On the other hand, when the temperature difference Tb−Ta is larger than the threshold Th, the CPU 101 switches the charging path from the first charging path 61A to the second charging path 61B and performs charging (S100).

As described above, in the second embodiment, when the temperature differences Ta−Tb and Tb−Ta between the two FETs 63A and 63B become larger than the threshold Th, the charging path is switched. The temperature differences Ta−Tb and Tb−Ta between the two FETs 63A and 63B can be kept smaller than the threshold Th. It is possible to prevent the temperature of parasitic diodes 64A and 64B from rising during charging to cause failure in the FETs 63A and 63B. In this configuration, the charging paths 61A and 61B are switched according to the actual temperatures of the FETs 63A and 63B. Therefore, it is possible to suppress abnormal heat generation of the parasitic diodes 64A and 64B as voltage drop elements regardless of the environmental temperature and the situation in the battery.

OTHER EMBODIMENTS

The present invention is not limited to the embodiments described with reference to the above description and the drawings. For example, the following embodiments are also included in the technical scope of the present invention.

(1) The energy storage device is not limited to the lithium ion secondary batteries B1 to B4, and may be other types of secondary batteries. They may be capacitors and the like. Although the first and second embodiments exemplify the configuration in which the plurality of lithium ion secondary batteries B1 to B4 are connected in series, a serial/parallel connection or a single cell configuration may be used.

The battery 20 is used for automobiles (four-wheeled vehicles) as described above, but may be used for motorcycles, electric vehicles, and hybrid electric vehicles. In addition, the battery is used to start the engine as described above, but may be used as an auxiliary battery. The use of the battery is not limited to a vehicle, but can be applied to, for example, a UPS or the energy storage apparatus of a solar power generation system. The battery 20 mounted on a motorcycle may not have a communication function with the motorcycle. Assume that the battery 20 has no communication function. In this case, even if the charge voltage (output voltage) of the alternator 170 mounted on the motorcycle is higher than the charge set voltage, it is not possible to perform adjustment to lower the charge voltage by sending a command from the battery 20 to the alternator 170. The battery 20 mounted on the motorcycle has a problem that the battery tends to be charged with a charge voltage higher than the charge set voltage. Applying this technology to the battery 20 mounted on the motorcycle can lower the charge voltage for the assembled battery 30 by the charge circuit 60 and prevent the assembled battery 30 from reaching an overvoltage.

(2) In the first embodiment, the CPU 101, which is the control unit, lowers the charge voltage for the assembled battery 30 by performing control to switch between the charging paths 61A and 61B during charging with the external charger 180. When the charge voltage (output voltage) of the alternator 170 is higher than the charge set voltage while the automobile 1 is running, the CPU 101, which is the control unit, may lower the charge voltage for the assembled battery 30 by performing control to switch between the charging paths 61A and 61B.

(3) Even though the charge voltage of the alternator 170 is higher than the charge set voltage, if the period during which the charge voltage is higher than the charge set voltage is shorter than a predetermined time, the CPU 101 need not execute control to lower the charge voltage by switching between the charging paths 61A and 61B. It is possible to suppress switching between the charging paths 61A and 61B when the charge voltage of the alternator 170 temporarily rises due to regenerative charging accompanying deceleration of the automobile 1. The predetermined time is, for example, a short time of about 50 msec.

(4) The first embodiment has exemplified the configuration in which the charge circuit 60 and the management unit 100 are provided inside the battery 20. The charge circuit 60 and the management unit 100 need not necessarily be installed inside the battery 20, and may be installed outside the battery 20 as long as they are mounted on the vehicle. That is, the battery 20 may be composed of only the lithium ion secondary batteries B1 to B4 and sensors for measuring voltage and current, and the management unit 100 provided outside the battery may monitor outputs from the sensors and switch between the charging paths 61A and 61B provided outside the battery. That is, this technology can also be applied to an energy storage system including the energy storage apparatus (the battery 20) including only an assembled battery and sensors, the charge circuit 60 located outside the energy storage apparatus, and the control unit (the management unit 100) located outside the energy storage device. Further, the embodiment has exemplified the configuration in which the charge circuit 60 is arranged on the positive electrode side of the assembled battery 30. The charge circuit (a circuit in which voltage drop elements and switches are arranged on a plurality of charging paths) may be arranged on the negative electrode side.

(5) In the first and second embodiments, the charge voltage is lowered by using the parasitic diodes 64A and 64B of the FETs 63A and 63B. The voltage drop element may be any element that causes a voltage drop when a current flows, and may be other than a diode. In particular, in the case of elements each of which causes a voltage drop when a current flows and has a negative temperature coefficient (the higher the temperature, the smaller the resistance value), if the elements are connected in parallel, current concentrates on some of the elements whose temperature has risen. Therefore, this technology may be applied to a case in which a diode is substituted for an element having a negative temperature coefficient. Since the collector-emitter of the transistor has a negative temperature coefficient and a saturation voltage of about 0.3 V (Vce=0.3 V), it can be used in place of the diode.

(6) In the first and second embodiments, the two FETs 63A and 65A connected back to back are arranged in the charging path 61A, and the two FETs 63B and 65B connected back to back are arranged in the charging path 61B. The FET 63A and 63B can be replaced with a diode (single unit). Further, the FETs 65A and 65B may be switches and can be replaced with bipolar transistors or the like.

(7) In the first embodiment, the two FETs 63A and 65A connected back to back are arranged in the charging path 61A, and the two FETs 63B and 65B connected back to back are arranged in the charging path 61B. In addition to this, the two FETs 63A and 65A connected back-to-back are arranged in only one charging path 61A, and a single diode and a single switch may be arranged in place of the two FETs 63B and 65B connected back-to-back in the other charging path 61B. Back-to-back connection may be performed so as to connect the sources to each other instead of connecting the drains of the FETs to each other.

(8) In the first embodiment, when the total voltage Ev of the assembled battery 30 is equal to or lower than the charge set voltage Eo, all the four FETs 63A, 63B, 65A, and 65B are turned on to allow energization of both the first charging path 61A and the second charging path 61B. However, only the FETs 63A and 65A in the first charging path 61A may be turned to allow energization of only the first charging path 61A.

(9) The first and second embodiments have exemplified the case in which when the total voltage Ev of the assembled battery 30 is higher than the charge set voltage Eo, a current is made to flow through the parasitic diodes 64A and 64B of the FETs 63A and 63B to lower the charge voltage. In addition to this, when the charge voltage (output voltage) of the alternator 170 or the external charger 180 is higher than the charge set voltage Eo, current may be made to flow through the parasitic diodes 64A and 64B of the FETs 63A and 63B to lower the charge voltage. A charge voltage may be obtained by detecting the potential difference between the pair of terminal portions 22P and 22N with a sensor.

If it is known in advance that a charger whose charge voltage is higher than the charge set voltage Eo is used, currents may be made to flow through the parasitic diodes 64A and 64B of the FETs 63A and 63B to always lower the charge voltage during charging regardless of the magnitude relationship between the charge voltage and the charge set voltage Eo and the magnitude relationship between the total voltage Ev and the charge set voltage Eo. Depending on the purpose of use and the environment of use, currents may be made to flow through the parasitic diodes 64A and 64B of the FETs 63A and 63B to always lower the charge voltage. The present invention can be applied to a case in which it is desired to delay the deterioration of the assembled battery 30 by lowering the charge voltage or the assembled battery 30 is to be used while being charged with a voltage lower than a setting.

Figure 13:
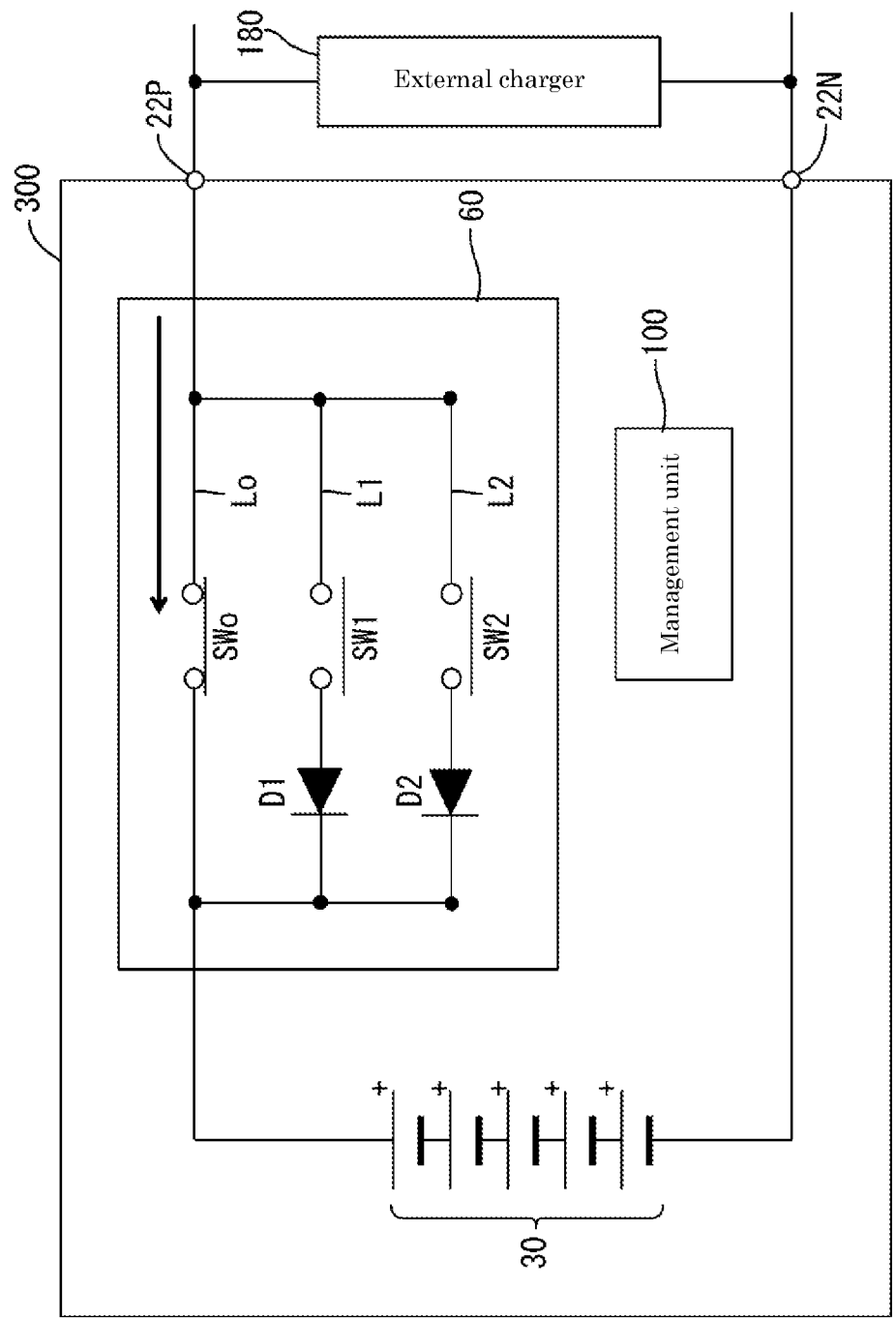
FIG. 13 is a block diagram showing another embodiment of the charging paths.

(10) In the first and second embodiments, two paths, that is, the first charging path 61A and the second charging path 61B are provided as charging paths to the assembled battery 30. When the charge voltage is equal to or lower than the charge set voltage Eo, charging is performed by branching a current into the two charging paths 61A and 61B, whereas when the charge voltage is higher than the charge set voltage Eo, charging is performed by making a current alternately flow through the two charging paths 61A and 61B. In addition to the above, like a battery 300 shown in FIG. 13, a battery may be provided with a charging path (main path) Lo to be used when the charge voltage is equal to or lower than the charge set voltage Eo and charging paths (sub-paths for voltage drop) L1 and L2 to be used when the charge voltage is higher than the charge set voltage Eo. The charging path Lo is provided with a switch SWo such as a relay and not provided with a voltage drop element such as a diode. The charging path L1 and the charging path L2 are connected in parallel with the charging path Lo, the charging path L1 is provided with a diode D1 and a switch SW1, and the charging path L2 is provided with a diode D2 and a switch SW2.

According to the battery 300, when the charge voltage is equal to or lower than the charge set voltage Eo, the management unit 100 turns on only the switch SWo and turns off the switches SW1 and SW2. As a result, when the charge voltage is equal to or lower than the charge set voltage Eo, only the charging path Lo having no voltage drop element is energized, and a charge current from an external charger 180 flows through the charging path Lo to charge an assembled battery 30.

On the other hand, when the charge voltage is higher than the charge set voltage Eo, the management unit 100 turns off the switch SWo and alternately turns on the switches SW1 and SW2. As a result, when the charge voltage is higher than the charge set voltage Eo, the charging path Lo is set in the deenergized state, and the charging paths L1 and L2 having the diodes D1 and D2 are alternately set in the energized state. Therefore, a charge current from the external charger 180 alternately flows through the charging paths L1 and L2 to charge the assembled battery 30. The charge voltage can be lowered by voltage drop due to the diodes D1 and D2 provided in the charging paths L1 and L2.

Figure 14:
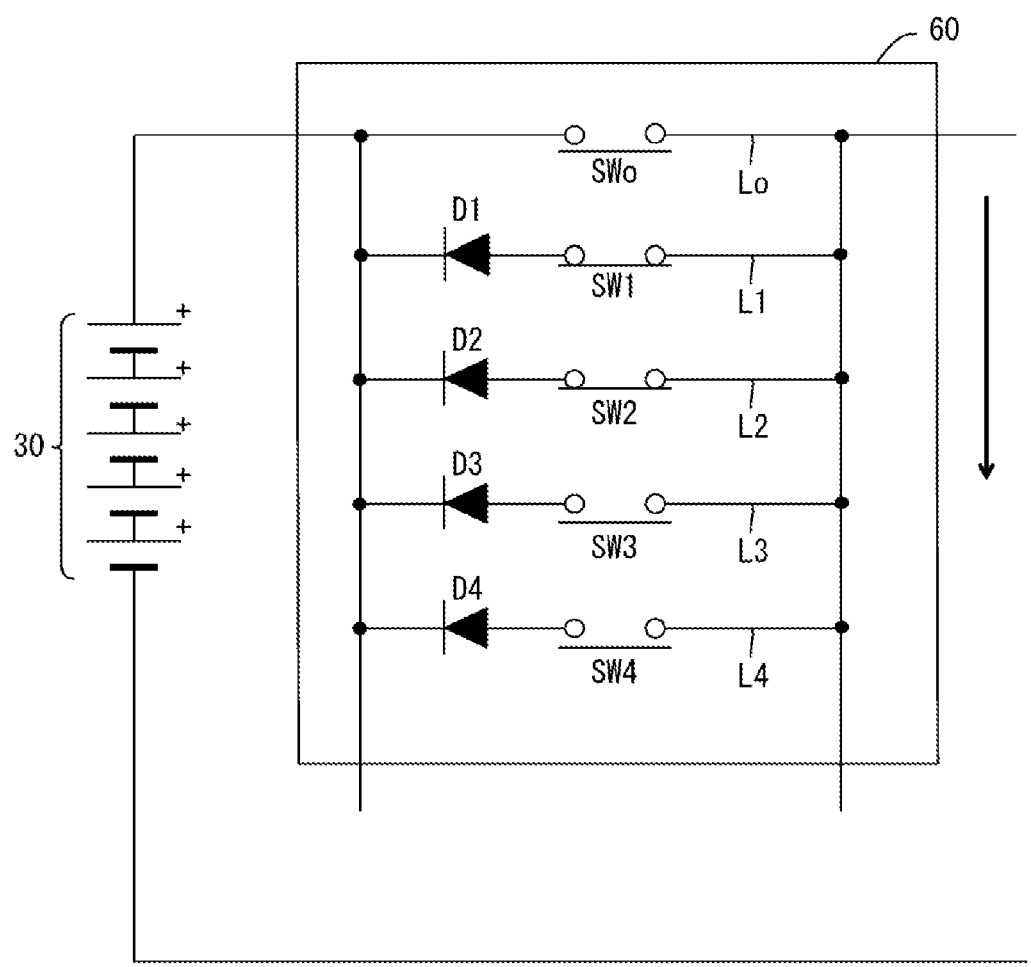
FIG. 14 is a block diagram showing another embodiment of the charging paths.
Figure 15:
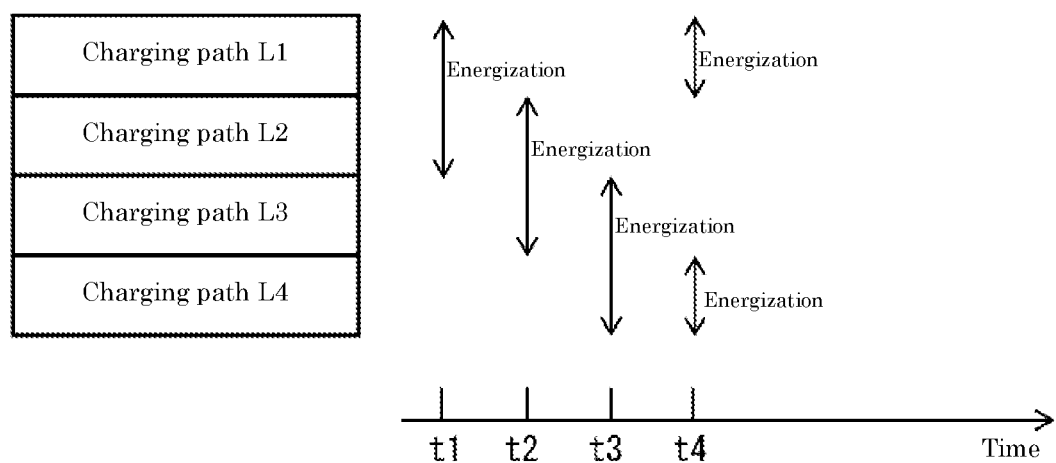
FIG. 15 is a chart showing the switching between the charging paths.

(11) The charging paths used when the charge voltage is higher than the charge set voltage Eo may include two parallel paths or more. As shown in FIG. 14, four charging paths L1 to L4 may be connected in parallel. To switch between the charging paths L1 to L4, the charging path to be deenergized may be switched during charging. For example, as shown in FIG. 15, the plurality of charging paths L1 to L4 to be energized may be switched in a shifted manner at predetermined time intervals.

Figure 16:
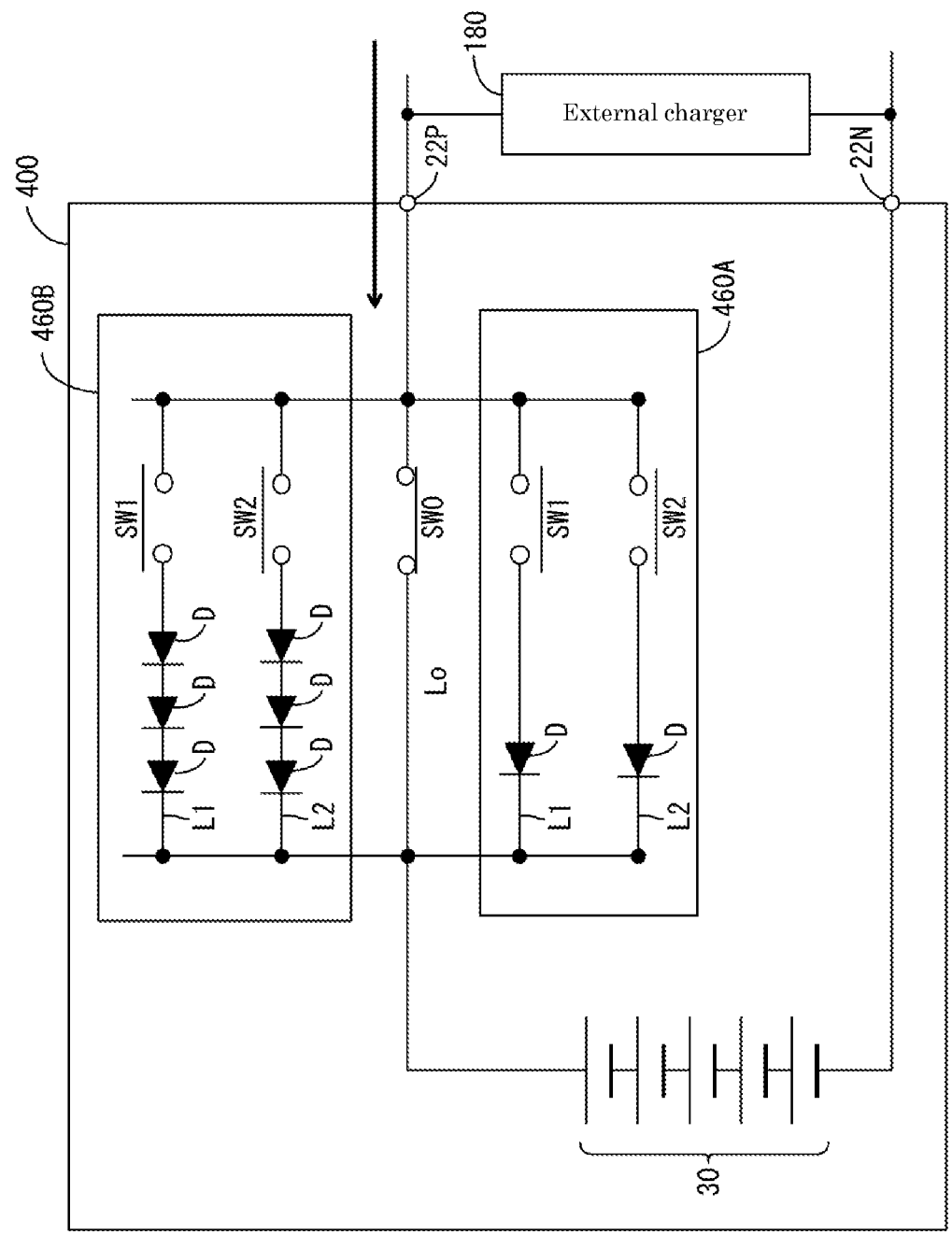
FIG. 16 is a block diagram showing another embodiment of the charging paths.

(12) A battery 400 shown in FIG. 16 has a configuration provided with two charge circuits 460A and 460B. The charge circuit 460A and the charge circuit 460B differ in the number of series diodes D arranged in each of the charging paths L1 and L2. In the charge circuit 460A, the number of series diodes is "1". In contrast, in the charge circuit 460B, the number of series diodes is "3". If the forward voltage of the diode D is 0.6 V, the voltage drop amount of the charge circuit 460A is 0.6 V, whereas the voltage drop amount of the charge circuit 460B is 0.6×3. The battery 400 has the merit of being capable of changing the amount of drop in charge voltage by switching between the charge circuits 460A and 460B. Further, the charge circuit 460B can use a voltage drop element other than a diode. By setting the voltage drop amount of the charge circuit 460B to a value assuming a case in which a 24-V system or 48-V system charger is connected, the 12-V system battery 400 can be charged even with a charger of a voltage class other than 12-V system, such as 24-V system or 48-V system.

Figure 17:
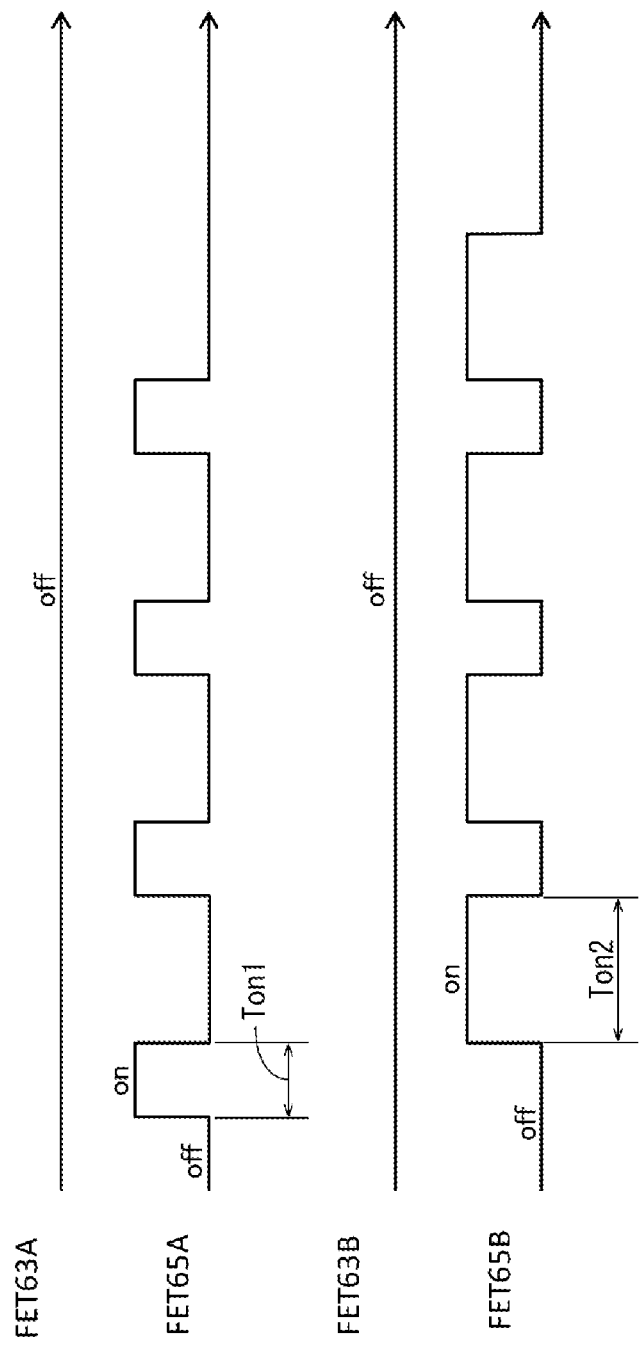
FIG. 17 is a chart showing the ON/OFF switching of each FET.

(13) In the first embodiment, when the total voltage Ev of the assembled battery 30 is higher than the charge set voltage Eo, as shown in FIG. 5, the FET 63A in the first charging path 61A and the FET 63B in the second charging path 61B are controlled to be turned off, whereas the FET 65A in the first charging path 61A and the FET 65B in the second charging path 61B are controlled so as to be alternately switched on and off every half cycle Ts/2. In addition to this, the ON times of the two FETs 65A and 65B may be changed according to temperature conditions for the charging paths 61A and 61B. FIG. 17 shows how each FET is turned on and off when a temperature Ta of the FET 63A is higher than a temperature Tb of the FET 63B (Ta>Tb). The CPU 101 sets an ON time Ton1 of the FET 65A in the first charging path 61A having a high temperature to be shorter than an ON time Ton2 of the FET 65B in the second charging path 61B having a low temperature.

The on-times Ton1 and Ton2 of the FETs 65A and 65B are changed according to the temperature Ta of the FET 63A and the temperature Tb of the FET 63B. When the temperature Ta of the FET 63A is lower than the temperature Tb of the FET 63B (Ta<Tb), the ON time Ton2 of the FET 65B in the second charging path 61B having a high temperature is set shorter than the ON time Ton1 of the FET 65A in the first charging path 61A having a low temperature. This makes the time during which the charging path with higher temperature is deenergized longer than the time during which the charging path 61B with lower temperature is deenergized, thereby suppressing heat generation in the charging path with higher temperature and reducing the temperature difference from the charging path with lower temperature.

(14) The second embodiment has exemplified the method of switching between the charging paths according to the temperature difference between the FETs 63A and 63B. Alternatively, the charging paths may be switched when one of the two FETs 63A and 63B reaches a threshold temperature.

Figure 18:
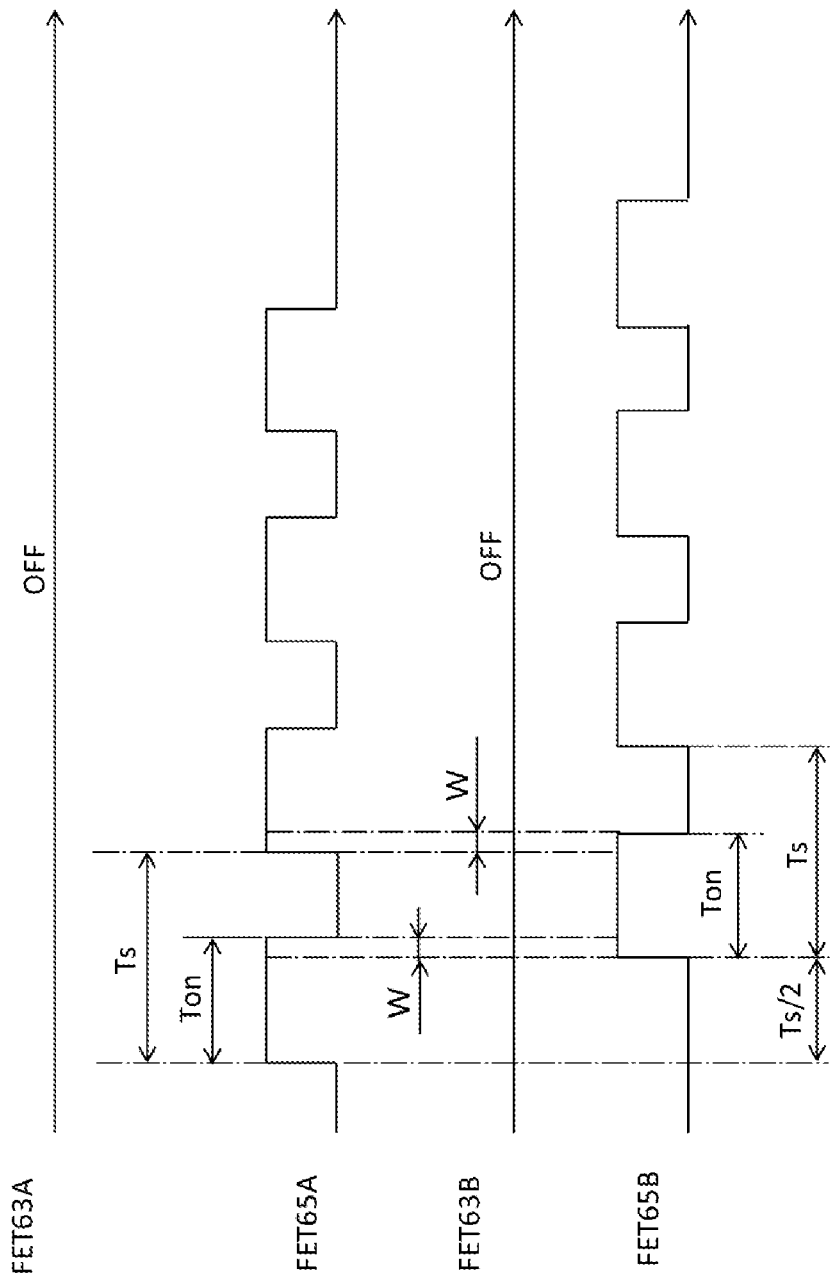
FIG. 18 is a chart showing the ON/OFF switching of each FET.

(15) In the first embodiment, when the total voltage Ev of the assembled battery 30 exceeds the charge set voltage Eo, the CPU 101 alternately turns on the FET 65A in the first charging path 61A and the FET 65B in the second charging path 61B to make charge currents alternately flow through the two charging paths 61A and 61B. As shown in FIG. 18, during the switching control of the charging paths 61A and 61B, the CPU 101 may control the two FETs 65A and 65B so as to ensure an overlapping period W in which both the FET 65A in the first charging path 61A and the FET 65B in the second charging path 61B are tuned on. Ensuring the overlapping period W makes it possible to prevent the two FETs 65A and 65B from being turned off at the same time and the charging from being stopped when the charging paths 61A and 61B are switched. In order to provide the overlapping period W, the ratio of an ON time Ton of the FETs 65A and 65B to the control cycle Ts may be set to be higher than 50%. For example, when the ratio of the on time Ton to the control cycle Ts is 60%, 10% of the control cycle Ts can be set as the overlapping period W.

(12) The techniques disclosed in the first and second embodiments can be implemented in various forms such as a charging path switching program for charging an energy storage device and a recording medium recording the program.

A switching program is a charging path switching program for charging energy storage devices. This program causes a computer (management unit 100) to, in a configuration in which the plurality of charging paths are connected in parallel and each charging path is provided with a voltage drop element and a switch connected in series, perform processing (S40) of controlling the switches to switch a charging path, of the plurality of charging paths, which is deenergized during charging.

REFERENCE SIGN LISTING

20: battery (corresponding to "energy storage apparatus" according to present invention)
30: assembled battery
41: current sensor
45: voltage detector
50: charge control apparatus
60: charge circuit
61A: first charging path
61B: second charging path
63A, 65A: FET
64A, 66A: parasitic diode
63B, 65B: FET
64B, 66B: parasitic diode
100: management unit
101: CPU (corresponding to "control unit" according to present invention)

The invention claimed is:

1. A charge control apparatus that controls charging of an energy storage device, the charge control apparatus comprising:
a plurality of charging paths connected in parallel for the energy storage device; and
two back-to-back connected field effect transistors (FETs) with built-in parasitic diodes and a switch connected in series on each of the plurality of charging paths; and
a control unit,
wherein:
the control unit controls each of the switches to switch a particular charging path, of the plurality of charging paths, which is deenergized during charging;
the controlled switching of the particular charging path is based on a temperature difference calculated based upon a difference between detected temperatures across the respective voltage drop elements provided in each of the plurality of charging paths;
the control unit performs control to simultaneously turn on the two back-to-back connected FETs in at least one of the charging paths connected in parallel when a charge voltage or a voltage of the energy storage device is lower than a set voltage; and
the control unit performs control, when a charge voltage or a voltage of the energy storage device is higher than a set voltage, to:
turn off the FETs, of the two FETs installed in each of the charging paths and back-to-back connected, in which the built-in parasitic diodes are in a forward direction with respect to a charging direction, and
turn on the FETs, of the two FETs installed in each of the charging paths and back-to-back connected, in which the built-in parasitic diodes are in a reverse direction with respect to the charging direction at different timings between the charging paths.

2. The charge control apparatus according to claim 1, wherein the control unit further executes switching between the charging paths when a charge voltage or a voltage of the energy storage device is higher than a set voltage.

3. The charge control apparatus according to claim 1, wherein the control unit further switches between the charging paths based on a set time.

4. The charge control apparatus according to claim 1, wherein the control unit further switches between the charging paths such that a time during which the charging path with higher temperature is deenergized is longer than a time during which the charging path with lower temperature is deenergized.

5. The charge control apparatus according to claim 1, wherein the control unit further controls the switches in the charging paths such that during the switching control of the charging paths, the switches in the charging paths have an overlapping period in which the switches are simultaneously turned on.

6. An energy storage apparatus comprising:
an energy storage device; and
a charge control apparatus according to claim 1.

7. A method for charging an energy storage device using a plurality of charging paths connected in parallel, the charging paths each including a voltage drop element and a switch connected in series, the method comprising controlling the switches to switch a particular charging path, of the plurality of charging paths, which is deenergized during charging, while performing charging upon lowering a charge voltage by using the voltage drop elements, the controlled switching of the particular charging path being based on a temperature difference calculated based upon a difference between detected temperatures across the respective voltage drop elements provided in each of the plurality of charging paths.

8. A charge control apparatus that controls charging of an energy storage device, the charge control apparatus comprising:
- a plurality of charging paths connected in parallel for the energy storage device; and
- two back-to-back connected field effect transistors (FETs) with built-in parasitic diodes a switch connected in series on each of the plurality of charging paths; and
- a control unit, wherein:
- the control unit controls each of the switches to switch a particular charging path, of the plurality of charging paths, which is deenergized during charging;
- the control unit, when a charge voltage or a voltage of the energy storage device is higher than a set voltage, executes a sequential switching between the plurality of charging paths in a shifted manner at predetermined time intervals so as to maintain current flow from multiple of the plurality of charging paths;
- the control unit performs control to simultaneously turn on the two back-to-back connected FETs in at least one of the charging paths connected in parallel when a charge voltage or a voltage of the energy storage device is lower than a set voltage; and
- the control unit performs control, when a charge voltage or a voltage of the energy storage device is higher than a set voltage, to:
  - turn off the FETs, of the two FETs installed in each of the charging paths and back-to-back connected, in which the built-in parasitic diodes are in a forward direction with respect to a charging direction, and
  - turn on the FETs, of the two FETs installed in each of the charging paths and back-to-back connected, in which the built-in parasitic diodes are in a reverse direction with respect to the charging direction at different timings between the charging paths.

9. The charge control apparatus according to claim 8, wherein the control unit executes switching between the charging paths when a charge voltage or a voltage of the energy storage device is higher than a set voltage.

10. The charge control apparatus according to claim 8, wherein the control unit switches between the charging paths based on a set time.

11. The charge control apparatus according to claim 8, wherein the control unit switches between the charging paths such that a time during which the charging path with higher temperature is deenergized is longer than a time during which the charging path with lower temperature is deenergized.

12. The charge control apparatus according to claim 8, wherein the control unit controls the switches in the charging paths such that during the switching control of the charging paths, the switches in the charging paths have an overlapping period in which the switches are simultaneously turned on.

13. An energy storage apparatus comprising:
- an energy storage device; and
- a charge control apparatus according to claim 8.

* * * * *

UNITED STATES PATENT AND TRADEMARK OFFICE
CERTIFICATE OF CORRECTION

PATENT NO. : 11,843,274 B2
APPLICATION NO. : 16/769846
DATED : December 12, 2023
INVENTOR(S) : Imanaka Page 1 of 1

It is certified that error appears in the above-identified patent and that said Letters Patent is hereby corrected as shown below:

On the Title Page

Item (54) and in the Specification Column 1, Lines 1-7:
In the title, "CHARGE CONTROL APPARATUS FOR CONTROLLING CHARGING OF AN ENERGY STORAGE DEVICE VIA PURALITY OF CHARGING PATHS CONNECTED IN PARALLEL ANSSOCIATED ENERGY STORAGE APPARTUS, AND AN ASSOCIATED CHARGING METHOD"

Should read:
--CHARGE CONTROL APPARATUS FOR CONTROLLING CHARGING OF AN ENERGY STORAGE DEVICE VIA A PLURALITY OF CHARGING PATHS CONNECTED IN PARALLEL, AN ASSOCIATED ENERGY STORAGE APPARATUS, AND AN ASSOCIATED CHARGING METHOD--.

Signed and Sealed this
Eighth Day of October, 2024

Katherine Kelly Vidal
*Director of the United States Patent and Trademark Office*